United States Patent [19]
Miller

[11] 3,971,216
[45] July 27, 1976

[54] LOAD RESPONSIVE SYSTEM WITH SYNTHETIC SIGNAL

[75] Inventor: Wendell E. Miller, Warsaw, Ind.
[73] Assignee: The Scott & Fetzer Company, Cleveland, Ohio
[22] Filed: June 25, 1975
[21] Appl. No.: 590,103

Related U.S. Application Data
[63] Continuation-in-part of Ser. No. 480,756, June 19, 1974, abandoned.

[52] U.S. Cl. ............................ 60/445; 60/452; 60/484; 137/596; 137/596.13; 91/412
[51] Int. Cl.² ............... F16H 39/46; F15B 11/16
[58] Field of Search ............ 60/445, 452, 462, 468, 60/484; 137/596, 596.13; 91/412

[56] References Cited
UNITED STATES PATENTS

| | | | |
|---|---|---|---|
| 3,488,953 | 1/1970 | Haüssler | 60/462 |
| 3,526,247 | 9/1970 | McMillen | 137/596.13 |
| 3,631,890 | 1/1972 | McMillen | 137/596.13 |
| 3,693,506 | 9/1972 | McMillen | 91/412 |
| 3,742,982 | 7/1973 | Miller | 60/452 X |
| 3,777,773 | 12/1973 | Tolbert | 91/446 X |
| 3,815,477 | 6/1974 | Ailshie et al. | 91/411 R |
| 3,841,096 | 10/1974 | Koppen | 91/414 X |

*Primary Examiner*—Edgar W. Geoghegan
*Attorney, Agent, or Firm*—McNenny, Pearne, Gordon, Gail, Dickinson & Schiller

[57] ABSTRACT

A load responsive hydraulic system uses a signal supply restrictor, a synthetic signal generator and a unique directional control valve to provide a signal fluid having a pressure magnitude which is at a predetermined value above the load actuating pressure of the system and which is called a synthetic signal pressure. The effective output of the system's pump is controlled by the difference between the pressure of the pump and the pressure magnitude of this synthetic signal pressure. During pressure operation of the system, the directional control valve applies the synthetic signal pressure to the pump control mechanism; and during standby operation, the control valve applies a signal fluid to the pump control mechanism whose pressure magnitude is not increased by the synthetic signal generator.

78 Claims, 8 Drawing Figures

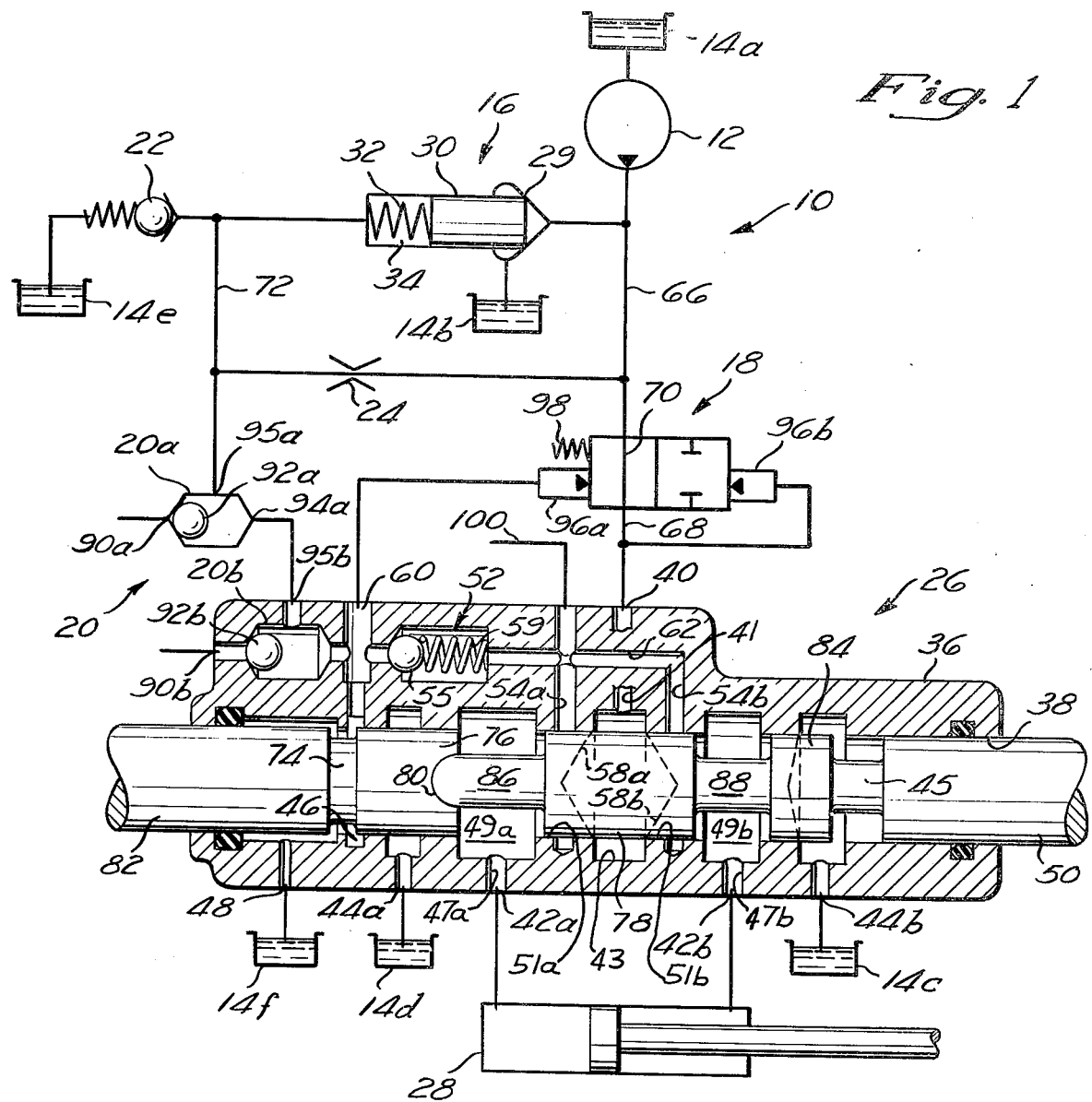
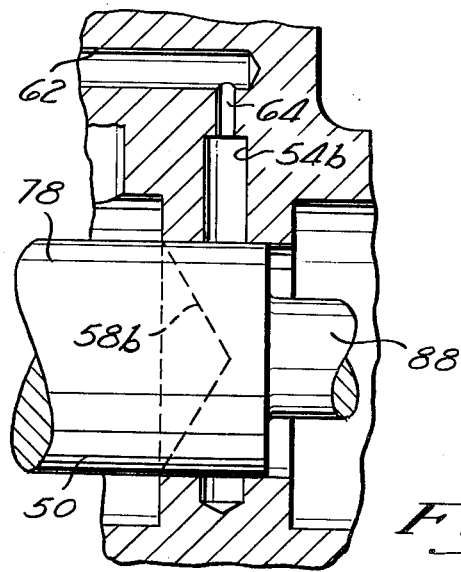
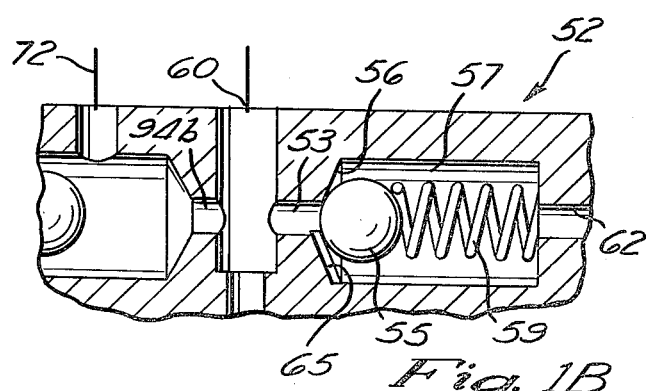
Fig. 1
Fig. 1A
Fig. 1B

LOAD RESPONSIVE SYSTEM WITH SYNTHETIC SIGNAL

BACKGROUND OF THE INVENTION

This is a continuation-in-part of Ser. No. 480,756, filed June 19, 1974 now abandoned in favor of this application.

FIELD OF THE INVENTION

The present invention pertains to load responsive systems in which the effective output of the system is controlled by the difference between the load actuating pressure and the pressure of the pump. This pressure differential is sensed across the directional control valve as fluid is directed from an inlet port to a work port. Thus the system pressure is maintained at a predetermined value above the load actuating pressure of the fluid motor; and fluid flow to the motor is proportional to the flow opening through the throttling orifice of the control valve.

In load responsive hydraulic systems it has been common to take pressurized fluid from either the control valve or the fluid motor, at the load actuating pressure of the fluid motor, and to use this fluid to control the effective output of a pump. If the pump is of the fixed displacement type, the control of the effective output has traditionally been accomplished by the use of a bypass valve controlling fluid flow from the pump output to a sump; and if the pump has been of the variable displacement or variable discharge type, a displacement or discharge control has been used.

INHERENT ADVANTAGES OF LOAD RESPONSIVE SYSTEMS

Load responsive hydraulic systems inherently have several advantages over conventional hydraulic systems. These include: more precise and consistent control of the flow rate to a fluid motor because the pressure differential across the throttling orifice of the control valve remains constant, or nearly so, lower valve spool actuating forces because the pressure differential across the throttling orifice is relatively small, lower heat rise and horsepower loss during pressure actuation of fluid motors because the pump pressure is controlled to be no greater than a predetermined pressure magnitude above the highest load actuating pressure of the fluid motors, and lower heat rise and horsepower loss during standby conditions because the entire fluid flow from a fixed displacement pump is bypassed to a sump through a bypass valve rather than through series connected neutral flow passages of the control valves.

AN INHERENT DISADVANTAGE OF LOAD RESPONSIVE SYSTEMS

Load responsive hydraulic systems have also had one serious limitation. When used with a fixed displacement pump, it is desirable to maintain a quite low bypassing pressure to limit heat rise and horsepower loss; and yet, a low bypassing pressure at standby has meant a low differential pressure under operating conditions, and a low differential pressure under operating conditions has severely limited the maximum flow capacity of the control valves because of the low differential pressure that is available to force fluid across the throttling orifices in the control valves.

ADVANCEMENT MADE BY THE PRESENT INVENTION

The present invention utilizes a synthetic signal generator to increase the highest load actuating pressure, by a predetermined pressure magnitude, to synthetic signal pressure. The use of this synthetic signal generator produces a higher difference between pump pressure and load actuating pressure, under operating conditions, than between pump pressure and sump pressure, during standby conditions; so that the maximum flow capacity of a given size of control valve is substantially increased, if not doubled.

DISCUSSION OF SIGNIFICANT PRIOR ART

There are three areas of prior art that are significant in pointing out the advantages of the present invention. These three areas will be enumerated and significant patents will be discussed therewith.

The first area of significance is in those portions of directional control valve design that pertain to the establishing of a first fluid flow path therein and the sensing of the load actuating pressure for use as a control signal pressure, and the establishing of a second fluid flow path for the attenuation of this control signal pressure when the control valve is in a standby position.

Haüssler, in U.S. Pat. No. 3,488,953, utilizes a load signal passage intercepting the valve spool bore intermediate of the inlet port and a work port to sense the load actuating pressure; and he uses a valved pilot passage at one end of the valve spool to attenuate the load actuating pressure. Access of the load signal passage to the spool bore is selectively controlled by the valve spool.

McMillen, in U.S. Pat. No. 3,526,247, teaches the use of a signal control port interposed between a work port and a return port. The signal control port has constant access to the spool bore and is selectively communicated with the work port and with the return port by the valve spool.

In U.S. Pat. No. 3,742,982, of common inventorship entity as that of the present invention, a longitudinal and radial passage within the valve spool is utilized to selectively communicate a signal control port with a work port and with a return port.

Ailshie et al., in U.S. Pat. No. 3,815,477, utilize the longitudinal and radial passage, as described above, for the sensing of the load actuating pressure, and a valved pilot passage intermediate of a spaced pair of inlet ports for the attenuation of the control signal pressure.

The second area of significance is that of: a logic means for use in interconnecting the first fluid flow paths of a plurality of directional control valves and in selecting, for use as the control signal pressure, the highest load actuating pressure of all directional control valves that are supplying pressurized fluid from the pump to respective ones of fluid actuated devices at any given time; and for interconnecting all of the second fluid flow paths to provide attenuation of the control signal pressure when all of the control valves are in their standby positions.

Haüssler, U.S. Pat. No. 3,488,953, made no provision for simultaneous use of two or more control valves and the selection of a highest load actuating pressure. Instead, he merely connected all load signal passages in parallel; so that there was no assurance of having a pump pressure of significant pressure magnitude to actuate a heavy load, at a high load actuating pressure, if another valve were sensing a lower load actuating pressure. For attenuation of the control signal pressure, he connected the valved pilot passages in series.

McMillen et al., U.S. Pat. No. 3,693,506, teach the use of a plurality of series-connected three-port logic valves to select the highest load actuating pressure from a plurality of directional control valves for use as a control signal pressure, to deliver this control signal pressure to a pump control mechanism, and to attenuate this control signal by fluid flow to a return port of one of the control valves.

Ailshie et al., U.S. Pat. No. 3,815,477, utilize parallel connected logic devices, each of which include a check valve of large conductance and an orifice of low conductance, to approximate the highest load actuating pressure by cross flow from the highest load actuating pressure to all lower load actuating pressures; and they use a plurality of series-connected pilot valve passages to attenuate the control signal pressure.

The third area of significance is that of a means to increase the difference between the highest load actuating pressure and the pump pressure, during operating conditions, in order to increase the maximum flow capacity of a given size control valve.

McMillen, U.S. Pat. No. 3,631,890, teaches the use of a third area piston to change the spring load on the bypass valve and thereby to increase the difference between the control signal pressure and the pump pressure. Tolbert, U.S. Pat. No. 3,777,773, discloses a similar device. Both of these devices have the inherent limitation of poor system response because of the time required to actuate the piston and thereby to increase the spring load in the bypass valve.

Ailshie et al., U.S. Pat. No. 3,815,477, disclose a load responsive hydraulic system in which a signal fluid flows from the pump, through a logic system which includes series and parallel connected orifices, to a fluid motor. When only one control valve is actuated, the signal fluid flows to that motor; but, when two or more fluid motors are actuated, the signal fluid flows through parallel connected orifices to all fluid motors operating at less than the highest load actuating pressure.

The bypass valve is connected to the signal conduit at a point wherein the bypass valve controlled by a pressure which is greater than the highest load actuating pressure by a pressure magnitude that may be almost as large as the pressure differential across one orifice when a plurality of control valves are supplying pressurized fluid to respective fluid motors at different load actuating pressures, or which is greater than the load actuating pressure by the pressure differential across two series-connected orifices when only one control valve is supplying pressurized fluid to a fluid motor. Thus the pump pressure is increased by the pressure differential across one or two orifices, according to whether one or more control valves are actuated simultaneously.

Koppen, U.S. Pat. No. 3,841,096, discloses a system which is superficially similar to the present invention but is different in construction, operation, and purpose. In the Koppen system, the signal fluid is supplied from the fluid motor rather than from the pump and a signal supply restrictor, no logic system is provided which will establish a flow path to the highest load actuating pressure, the highest load actuating pressure is decreased by a relief valve rather than increased, and the flow capacity of the system is decreased rather than increased.

COMPARISON WITH PRIOR ART

In the present invention, a signal fluid is supplied by the pump, through a signal supply restrictor or orifice to a signal conduit, through a logic system to a plurality of control valves, and through a separate synthetic signal generator in each control valve, to the work port having the highest load actuating pressure therein; so that a synthetic signal pressure is produced that is a predetermined value above the highest load actuating pressure.

In contrast, the Ailshie system does not provide a fluid flow path to the work port having the highest load actuating pressure therein, but to all work ports having lower load actuating pressure therein; and the Ailshie system does not produce a synthetic signal pressure that is a predetermined value above the highest load actuating pressure, but it produces a signal pressure that is higher than the highest load actuating pressure by the differential pressure across one or two orifices, depending upon the operating conditions.

The present invention utilizes a series connected logic system. Ailshie utilizes a parallel connected logic system. The present invention connects both fluid flow paths to the logic system, Ailshie only the first fluid flow path. The present invention connects each of the second fluid flow paths directly to sump. The Ailshie system connects all of the second fluid flow paths in series.

Three-port logic valves have the inherent capability of selecting the highest pressure supplied to logic ports at the opposite ends thereof and supplying that highest pressure to the logic port at the center logic port thereof. However, in order for a three-port logic valve to establish a flow path from the center logic port to an end logic port having a lower fluid pressure therein, the other end logic port must be open to a yet lower fluid pressure. That is, the other end logic port cannot be blocked. If one end logic port is blocked, fluid flow from the center logic port will block the other end logic port.

Thus, the required direction of fluid flow, for the synthetic signal generators to increase the load actuating pressure, places a requirement upon the directional control valves that both first and second fluid flow paths, of each control valve, must be connectable to the same end logic port of a three-port logic valve.

The present invention provides three embodiments of control valves all of which are advantageous over the above-cited art in that they both include a synthetic signal generator which is effective to increase the pressure magnitude of fluid flow through a selected one of two fluid flow paths and that they are all adaptable for the connection of both fluid flow paths to a single logic port of a three-port logic valve. These two features are important because the synthetic signal pressure cannot be developed unless a synthetic signal generator is supplied and a fluid flow path is established to the highest load actuating pressure. A fluid flow path will not be established to the highest load actuating pressure by three-port logic valves unless both first and second fluid flow paths, of a given control valve, are connected to the same logic port of a three-port logic valve. But, if all of the control valves are designed to allow the connection of both fluid flow paths of all control valves to respective ones of end logic ports, then all end logic ports are always either open to a lower pressure through a second fluid flow path or to a fluid pressure that will be either the highest load actuating pressure or a lower load actuating pressure, and the logic system will establish a flow path from the signal supply restrictor to the highest load actuating pressure.

In summary, the present invention utilizes a signal supply restrictor, a series-connected logic system of three-port logic valves, control valves each having first and second fluid flow paths connected in parallel to an end logic port of one of the three-port logic valves, and a synthetic signal generator interposed in at least one fluid flow path of one of the valves. The system thus described, solves the inherent problem of low flow capacity as outlined earlier, solves the problem of poor system response as is inherent in the McMillen and Tolbert systems, and solves the problem of an unpredictable increase in differential pressure across the throttling orifice that is inherent in the system disclosed by Ailshie et al.

SUMMARY OF THE INVENTION

The present invention utilizes a signal supply restrictor which supplies a signal fluid from the pump and a synthetic signal generator which pressurizes the signal fluid to a predetermined value above one of two pressures sensed by a special directional control valve.

The directional control valve provides a first fluid flow path that communicates with the fluid motor when the control valve is in an operating position, and a second fluid flow path that communicates with a sump when the control valve is in a standby position. Thus, the first fluid flow path senses the load actuating pressure and the second fluid flow path senses the sump pressure.

In a system having a fixed displacement pump and a differential pressure bypass valve, the signal fluid flows through the first fluid flow path and through the synthetic signal generator to the fluid motor when the control valve is in an operating position and pressurized fluid is being supplied from the pump to the motor. When the control valve is in a standby position and the fluid motor is isolated from the pump, the signal fluid flows through the second fluid flow path to the sump, avoiding the synthetic signal generator.

Thus, with the control valve in the operating position, the pump pressure is equal to the load actuating pressure of the motor, plus the predetermined increase caused by the synthetic signal generator, plus the differential opening or operating pressure of the bypass valve; but, with the control valve in the standby position, the pump pressure is equal to the sump pressure, plus the differential opening or operating pressure of the bypass valve.

The result is that the synthetic signal generator is effective to control the pump pressure to pressure magnitudes to provide a greater difference between pump pressure and load actuating pressure when the control valve is in the operating position than the difference between pump pressure and sump pressure when the control valve is in the standby position.

The end results are: the differential pressure across the throttling orifice of the control valve is increased by the increase of the load actuating pressure to a synthetic signal pressure, more fluid per unit time can be supplied through a directional control valve of a given size, and the pump pressure under standby conditions is kept low to minimize power loss and heat rise.

In a system having a variable displacement pump, the synthetic signal generator cooperates with the second fluid flow path to produce a synthetic signal pressure which is at a predetermined value above the sump pressure. When the control valve is in a standby position, this synthetic signal pressure is applied to the displacement control mechanism of the variable displacement pump and the standby pressure of the pump is maintained at a relatively high value. Then, when the control valve is in an operating position, the control valve uses the first fluid flow path to avoid the synthetic signal generator and to apply only the load actuating pressure of the fluid motor to the displacement control mechanism.

The results are that: the difference between pump pressure and sump pressure at standby is greater than the difference between pump pressure and load actuating pressure under operating conditions, a high standby pressure is available to operate auxiliary equipment, and a lower differential pressure under operating conditions minimizes the power loss across the throttling orifice of the control valve.

For example, in a system having a fixed displacement pump, the present invention might be used to raise a standby pressure of 50 psi to a differential operating pressure of 150 psi, thereby increasing the flow capacity of the control valve. Or, in a system having a variable displacement pump, a pressure of 500 psi might be maintained at standby for the actuating of auxiliary equipment, and the differential operating pressure might be reduced to 150 psi to minimize power loss across the control valve when fluid is supplied to the fluid motor.

In addition to the operational advantages of the hydraulic circuitry of the present invention as have already been described, the construction of the control valves is also unique as will be described subseuently.

A first objective is to provide a load responsive hydraulic system having a fixed displacement pump in which the differential pressure across the throttling orifice of the control valve is higher than the standby pressure of the system.

A second objective is to provide a load responsive hydraulic system having a variable displacement pump in which the differential pressure across the throttling orifice of the control valve is lower than the standby pressure of the pump.

A third objective is to provide a signal supply restrictor and a synthetic signal generator which cooperate to supply pump fluid to a signal conduit and which will pressurize this signal fluid to a predetermined value above a sensed pressure.

A fourth objective is to provide a load responsive hydraulic system in which pressurized fluid from the pump is supplied to the logic means to pressure actuate the poppet type shuttle thereof.

A fifth objective is to provide a directional control valve having first and second fluid flow paths which sense load actuating and sump pressures respectively.

A sixth objective is to provide a directional control valve having a synthetic signal generator in one fluid flow path, so that the pump is controlled by one second pressure plus the differential pressure of the synthetic signal generator when the control valve is in one position, and by the other sensed pressure when the control valve is in another position.

A seventh objective is to provide a control valve in which the synthetic signal generator is built into the valve spool.

An eighth objective is to provide a control valve which includes a valved signal supply restrictor.

A ninth objective is to provide a control valve in which the inlet port is selectively communicated with a signal control port.

A tenth objective is to provide a control valve for load responsive hydraulic systems which is simple in design.

An eleventh objective is to provide a control valve for load responsive hydraulic systems which is compact in design.

A twelfth objective is to provide a control valve for load responsive hydraulic systems which is economical to manufacture.

A thirteenth objective is to provide a load responsive hydraulic system which achieves maximum fluid flow through a given size of control valve.

These and other objectives will be apparent to the reader from the detailed description.

BRIEF DESCRIPTION OF THE DRAWINGS

FIG. 1 is a schematic drawing of the hydraulic system utilizing a fixed displacement pump and a bypass valve, and showing the directional control valve in cross section;

FIG. 1A is an enlarged view of a portion of the control valve of FIG. 1;

FIG. 1B is an enlarged view of another portion of the control valve of FIG. 1;

DETAILED DESCRIPTION OF THE INVENTION

Figure 2:
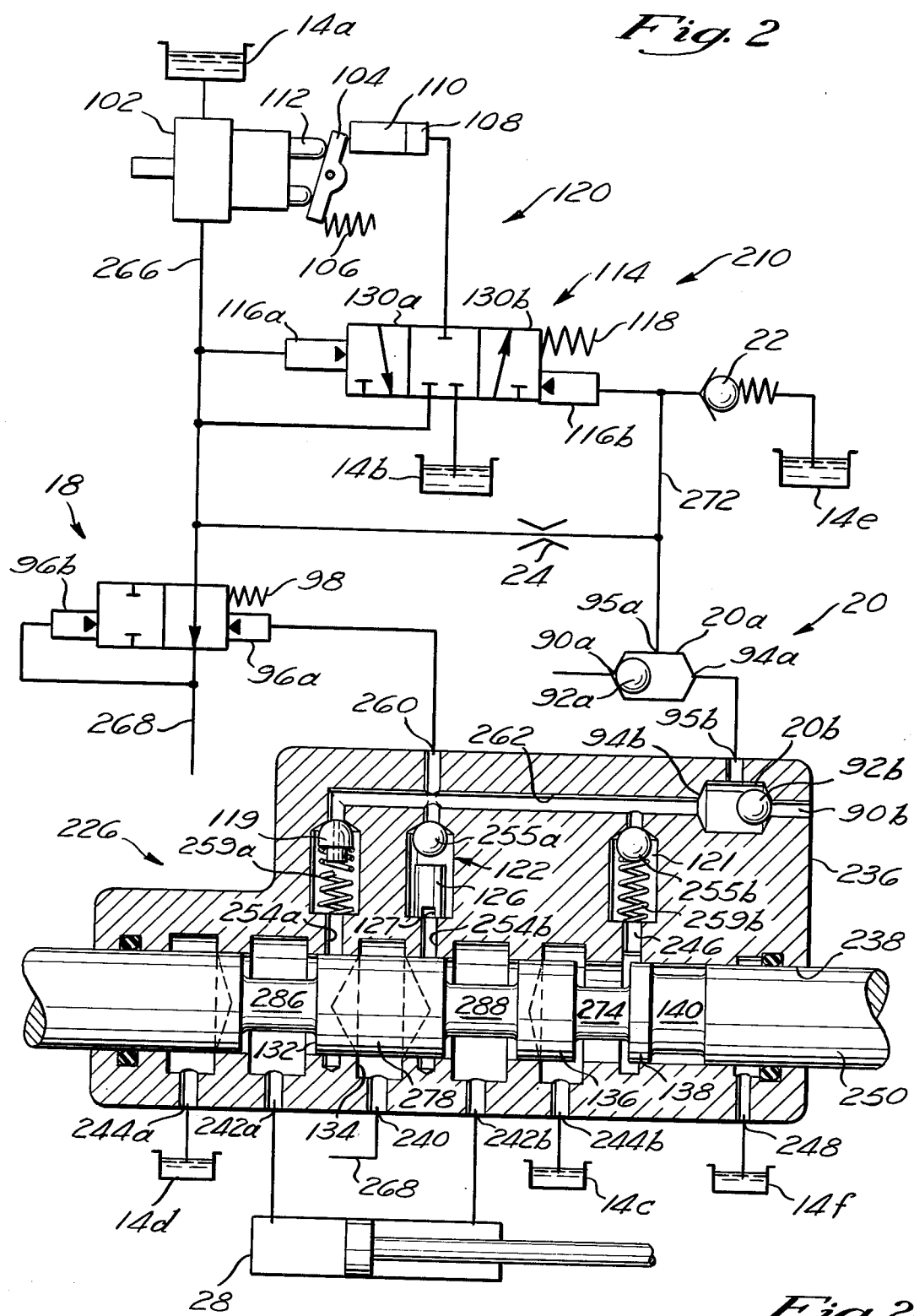
FIG. 2 is a schematic drawing of a second embodiment of the hydraulic system, utilizing a variable displacement pump and a displacement control mechanism, and showing a second directional control valve in cross section.

The Embodiment of FIGS. 1, 1A, and 1B

Referring now to FIGS. 1, 1A, and 1B, load responsive system 10 includes fixed displacement pump 12, sumps 14, differential pressure actuated bypass valve or fluid responsive means 16, differential pressure actuated flow valve 18, three-port logic valve 20a, pilot relief valve 22, signal supply restrictor or orifice 24, directional control valve 26, and fluid motor or fluid actuated device 28.

Bypass valve 16 includes seat 29, piston 30, spring 32, and signal chamber 34.

Control valve 26 includes a valve body 36 having spool bore 38, inlet port 40, work ports 42a and 42b, a return port means that includes return ports 44a and 44b and return port or drain passge 48, and attenuation signal passage 46 which intercepts bore 38.

Control valve 26 also includes valve spool or movable valving element 50 which is slidably fitted into bore 38, three-port logic valve 20b, synthetic signal generator or relief valve 52, and load signal passages 54a and 54b which intercept spool bore 38.

Synthetic signal generator or relief valve 52 includes input port 53 (FIG. 1B), poppet or ball 55, seat 56, spring chamber or control port 57, and spring 59. Spring 59 forces ball 55 against seat 56 to provide a predetermined flow resistance.

Conical seat 56 of synthetic signal generator 52 includes a groove 65 that prevents complete sealing of the seat 56 by the poppet or ball 55 and thereby provides a restricted flow path or reverse flow means.

Valve body 36 includes signal control port 60 which connects logic valve 20b to attenuation signal passage 46 and to synthetic signal generator 52.

Inlet port 40 includes passage portion 41 and annular groove portion 43. In like manner, work ports 42a and 42b include passage portions 47a and 47b and annular groove portions 49a and 49b.

Spool bore 38 of valve body 36 includes cylindrical bore lands 51a and 51b which are interposed between annular groove portion 43 and respective ones of annular groove portions 49a and 49b, which sealingly engage a spool land 78 of valve spool 50 to isolate inlet port 40 from respective ones of work ports 42a and 42b, and which include triangular shaped metering or throttlling notches 58a and 58b.

Notches 58a and 58b are formed, respectively, into the cylindrical surfaces of bore lands 51a and 51b and serve to extend inlet port 40 toward respective ones of work ports 42a and 42b.

Operation of the FIG. 1 configuration, with valve spool 50 in the standby position as shown, is as follows: pump 12 receives fluid from sump 14a and delivers pressurized fluid to inlet port 40 via pump pressure conduits 66 and 68 and through path 70 of flow valve 18. Fluid from pump pressure conduit 66 is supplied to signal conduit 72 and to signal chamber 34 through signal supply restrictor or orifice 24 for use as a signal fluid. Signal conduit 72 delivers this signal fluid through logic means 20 which includes logic valves 20a and 20b, to signal control port 60 and to attenuation signal passage 46. Attenuation signal passage 46 is communicated to return port 48 and to sump 14f by reduced diameter portion 74 of spool 50. Thus, a negligible fluid pressure is applied to signal chamber 34 of bypass valve 16; and pump pressure inside seat 29 is able to move piston 30 to the left and to discharge all of the output of pump 12 into sump 14b as a function of the load of spring 32.

With valve spool 50 in the standby position as shown, attenuation signal passage 46 cooperates with reduced diameter portion 74 and with return port 48 to provide a second fluid flow path which communicates signal control port 60 with sump 14f.

When valve spool 50 is moved to the left of the position shown, spool land 76 blocks the second fluid flow path by isolating attenuation signal passage 46 from return port 48.

Movement of valve spool 50 to the left of the position shown is also effective to move spool land 78 to a position wherein load signal passage 54b is uncovered, so that load signal passage 54b is communicated with work port 42b and the resultant first fluid flow path connects signal control port 60 to work port 42b. Additional movement of valve spool 50 to the left, to an operating position, moves land 78 to uncover notch 58*b*, or a portion thereof, thereby opening a throttling orifice between inlet port 40 and work port 42*b*. The flow area of this throttling orifice is selectively determined by selectively positioning valve spool 50 and land 78 thereof to the left, toward an operating position, in accordance with the desired fluid flow rate from pump 12 to fluid motor 28. At this time, notch 80 communicates work port 42*a* with return port 44*a* and sump 14*d* to receive fluid exhausting from motor 28.

In the meantime, pump fluid being supplied to signal conduit 72 through orifice 24, for use as a signal fluid, flows through logic valves 20*a* and 20*b*, signal control port 60, synthetic signal generator 52, hole 62, and load signal passages 54*b*. Thus, this signal fluid is pressurized by the load actuating pressure of fluid motor 28 which is sensed by load signal passage 54*b*, plus the flow resistance of the signal fluid flowing through relief valve 52; so that the load actuating pressure of motor 28,, as sensed in signal conduit 72, is increased to a synthetic signal pressure by the action of synthetic signal generator 52.

This synthetic signal pressure is supplied to signal chamber 34 by signal conduit 72 and by logic means 20 that is interposed into signal conduit 72; so that bypass valve 16 controls the pressure and the effective output of pump 12 by bypassing all fluid from pump 12 to sump 14*b* that is in excess of the quantity flow necessary to maintain the system at a pressure which is equal to the synthetic signal pressure plus the load of spring 32. Thus, with the pressure of pump 12 being maintained at a pressure magnitude which is equal to the sum of the synthetic signal pressure plus the load of spring 32, the fluid flow rate from pump 12 to motor 28 is substantially a linear function of the area of the throtting orifice between inlet port 40 and work port 42*b* as determined by the selective positioning of valve spool 50 and spool land 78 thereof.

Movement of spool 50 to the right, to a second operating position, is similar: land 82 occludes the second fluid flow path, and the first fluid flow path includes load signal passage 54*a*.

Valve spool 50 is also movable to the left, past the first operating position, to a float position. Land 84 moves far enough to the left that work port 42*b* is communicated to return port 44*b* around reduced diameter portion 45 of valve spool 50; and both work port 42*a* and attenuation signal passage 46 are communicated to return port 44*a* via notch 80 and reduced diameter portion 86 of spool 50.

Whereas land 84 blocks communication between load signal passage 54*b* and work port 42*b* when valve spool 50 is in the float position, load signal passage 54*b* is open to inlet port 40 via reduced diameter portion 88 of valve spool 50. However, ball 55 of synthetic signal generator 52 prevents an excessive loss of the fluid from pump 12 to sump 14*d* through the second fluid flow path which includes attenuation signal passage 46; although groove 65 in seat 56 permits a small leakage flow from pump 12 to sump 14*d* via attenuation signal passage 46. Thus, it can be seen that if synthetic signal generator 52 were not needed to provide a synthetic signal higher than the load actuating pressure, a check valve could be used in the place of synthetic signal generator 52 to provide a one-way flow means.

Pilot relief valve 22 interconnects signal conduit 72 and sump 14*e* and serves to limit both the maximum pressure in signal conduit 72 and the maximum bypass pressure of bypass valve 16.

Referring now to FIGS. 1 and 1B, logic valves 20*a* and 20*b* include third logic ports 90*a* and 90*b*, respectively, for connection to signal control ports (not shown, similar to signal control port 60) of control valves identical or similar to control valve 26. If a synthetic signal pressure (a load actuating pressure plus the pressure differential of a synthetic signal generator), a load actuating pressure, or any other fluid pressure, from a signal control port, or elsewhere, is supplied to third logic port 90*a* of logic valve 20*a* at a higher pressure than that in signal control port 60, ball or poppet type shuttle 92*a* will move to the right to communicate signal chamber 34 with the signal control port that is connected to third logic port 90*a* and to block communication of signal chamber 34 with signal control port 60. Thus, bypass valve 16 is controlled by the highest synthetic signal pressure of any control valve which is supplying pressurized fluid to a fluid motor.

Referring again to FIGS. 1, 1A, and 1B, a synthetic signal generator or orifice 64 is interposed between hole 62 and load signal passage 54*b* of the modification shown in FIG. 1A; so that the sum of the pressure differentials of snythetic signal generators 52 and 64 is added to the load actuating pressure of fluid motor 28 to make the synthetic signal pressure when pump 12 is supplying fluid to fluid motor 28 via work port 44*b*. If synthetic signal generator 52 were removed, the synthetic signal pressure, as applied to second logic port 94*b* would include only the load actuating pressure plus the pressure differential of synthetic signal generator or orifice 64 when pump 12 supplied fluid to work port 42*b*; and only the load actuating pressure of fluid motor 28 would be applied to second logic port 94*b* when pump 12 supplied fluid to work port 42*a*.

Assume now that third logic ports 90*a* and 90*b* of logic valves 20*a* and 20*b* are each connected to a control valve (not shown) that is similar to control valve 26. Also assume that all of the control valves are in the neutral or standby position as shown. Under these conditions, each of the control valves provides a second flow path from a signal control port, through an attenuation signal passage (similar to attenuation signal passage 46), and to a sump. Since ball 92*a* cannot simultaneously block both logic ports 90*a* and 94*a*, and ball 92*b* cannot simultaneously block both logic ports 90*b* and 94*b*, there will be a flow path from signal conduit 72 and first logic port 95*a* to a sump, depending upon the chance location, or gravity forced location, of balls 92*a* and 92*b*.

Assume now the balls 92*a* and 92*b* are chance or gravity located against second logic ports 94*a* and 94*b* respectively; and assume that valve spool 50 of control valve 26 is then moved to the left to communicate work port 42*b* with load signal passage 54*b* and with notch 58*b*. At this time, the load actuating fluid in work port 42*b* is reverse transferred through the synthetic signal generator or orifice 64 and through groove 65 of seat 56 to move ball 92*b* away from second logic port 94*b* and into sealing contact with third logic port 90*b*. Then this reverse transferred fluid from work port 42*b* flows through first logic port 95*b* of logic valve 20*b* to second logic port 94*a* of logic valve 20*a* and is effective to move ball 92*a* away from second logic port 94*a* and into sealing contact with third logic port 90*a*. Thus, the reverse flow capability of synthetic signal generator or orifice 64 and the reverse flow capcity of the groove 65, which serves as a reverse flow means, are effective to provide pressurized fluid for pressure shifting balls 92a and 92b to positions wherein reversible fluid communication is established between signal supply restrictor 24 and work port 42b; and then the flow of fluid is from the higher pressure magnitude of pump 12, through restrictor 24, to work port 42b.

Referring now to FIG. 1, the function of flow valve 18 is as follows: when valve spool 50 is moved to the left and pressurized fluid is being supplied to fluid motor 28 by control valve 26 at a first load actuating pressure and another control valve (not shown) is supplying pressurized fluid to another fluid motor (not shown), at a higher load actuating pressure, then the pressure of pump 12 will be controlled by the higher load actuating pressure plus the pressure increases of another synthetic signal generator (not shown) to a pressure that is excessive for actuating fluid motor 28. Then the pressure drop across the throttling orifice between inlet port 40 and work port 42b of control valve 26 will be too high, and the flow of fluid to fluid motor 28 will be larger than it should be for a given area of the throttling orifice.

This higher than normal pressure drop is used to actuate flow valve 18. Pump pressure in conduit 68 is applied to operator 96b to close flow valve 18, and the synthetic signal pressure in signal control port 60 is applied to operator 96a to open flow valve 18. Flow valve 18 throttles flow to reduce the pressure in conduit 68 whenever the difference between the pump pressure in conduit 68 and the synthetic signal pressure in signal control port 60 is excessive, as determined by the load of spring 98.

In addition, whenever valve spool 50 is in the standby position as shown, the pressure in signal control port 60 approximates sump pressure, the fluid pressure in operator 96a is negligible, the pump pressure in conduit 68 moves flow valve 18 to a closed position, and pressure in inlet port 40 is minimized. The result is that drift of fluid motor 28, as caused by leakage of pump pressure from inlet port 40 to a work port, 42a or 42b, is reduced.

Optionally, operator 96a can be connected to conduit 100 instead of being connected to signal control port 60. If this change is made, flow valve 18 is actuated by the difference between pump pressure and load actuating pressure when valve spool 50 is moved to the right communicating conduit 100 with work port 42a; and flow valve 18 is actuated by a synthetic signal pressure which includes the flow resistance of orifice 64 (FIG. 1A) plus the load actuating pressure of fluid motor 28 in work port 42b when valve spool 50 is moved to the left to an operating position.

Finally, referring to FIG. 1 again, notice that signal control port 60, hole 62, and load signal passage 54a cooperate to establish the first fluid flow path, signal control port 60, attenuation signal passage 46, and reduced diameter portion 74 of valve spool 50 cooperate to establish the second fluid flow path; and so a signal control means is provided that establishes and controls first and second fluid flow paths.

Similarity of Embodiments, Components, and Numbers

Having described FIG. 1 in considerable detail, attention is now directed to the similarity of certain components and features of the other two embodiments, and then the other embodiments may be dealt with in less detail.

Notice that all three embodiments include two three-port logic valves which have logic ports for the connection of the signal control ports of two additional control valves. The three-port logic valve in the valve spool of the control valve of FIG. 3 serves a different purpose and will be described later.

Notice that all three embodiments include a signal control means that establishes first and second fluid flow paths.

Notice that all three embodiments include a synthetic signal generator in one or both fluid flow paths.

Notice that all three embodiments include flow valves 18. These flow valves are connected for actuation by the synthetic signal pressure in FIGS. 1 and 3, for actuation by the load actuating pressure in the embodiment of FIG. 1 when operator 96a is connected to conduit 100, for actuation by the load actuating pressure when the valve spool is moved in one direction and for actuation by the synthetic signal pressure when the valve spool is actuated in the other direction in the FIG. 2 embodiment, and for actuation by sump pressure applied to operator 96a when the valve spool is in the standby position in the embodiments of FIGS. 1 and 3.

Figure 3:
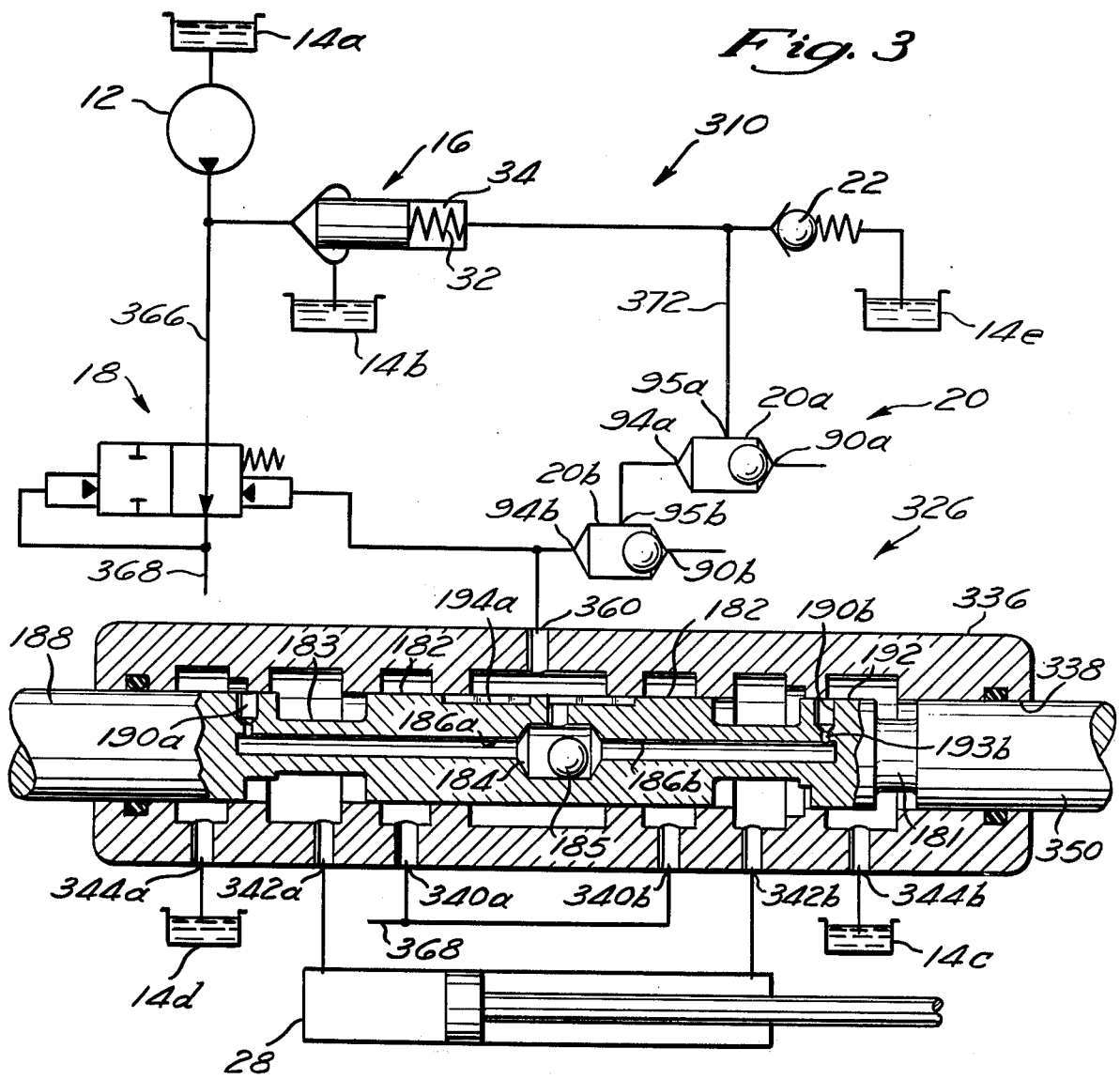
FIG. 3 is a third schematic drawing of a third embodiment of the hydraulic system showing a third embodiment of the directional control valve in cross section.

Notice that the configurations of FIGS. 1 and 3 include a fixed displacement pump 12 and bypass valve 16.

Notice that all three configurations include fluid motor or fluid actuated device 28.

Notice that all of the control valves include two work ports and so they all have two operating positions. In addition, all of the control valves include a float position wherein the valve spool is moved further to the left than for the operating positions and wherein both work ports are connected to both return ports.

Notice that all three control valves include O-ring seals at both ends of the valve spools for sealing between the valve spools and the valve bodies.

Where components and parts of components are identical, identical numbers are used, and where components and parts of components are similar and have identical names, a number prefix is added which corresponds to the number of the figure.

Figures 2A, 2B:
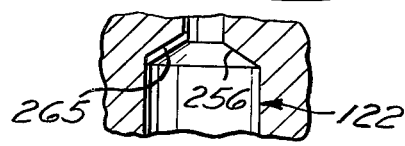
FIG. 2A is an enlarged view of a portion of the control valve of FIG. 1.
FIG. 2B is an enlarged view of another portion of the control valve of FIG. 1.

The Embodiment of FIGS. 2, 2A, and 2B

Referring now to FIGS. 2, 2A, and 2B, load responsive system 210 includes variable displacement pump 102 which includes swash plate 104 whose inclination is controlled by spring 106 and by fluid pressure in chamber 108 acting upon control piston 110 to control the stroke of pistons 112.

Sensor valve 114 includes operator 116a, operator or signal chamber 116b, and spring 118. Operator 116b serves as a signal chamber for displacement control mechanism or fluid responsive means 120 which includes sensor valve 114 and elements 104, 106, 108, and 110 of pump 102.

Directional control valve 226 includes valve body 236 having a spool bore 238, inlet port 240, work ports 242a and 242b, a return port means including return ports 244a and 244b and return port or drain passage 248, and attenuation signal passage 246.

Valve spool or movable valving element 250 is slidably fitted into bore 238 and is in the standby position, as shown.

Directional control valve 226 also includes synthetic signal generator or relief valve 119, synthetic signal generator or relief valve 121, load signal passages 254a and 254b, signal control port 260, hole 262, one-way flow valve 122, and three-port logic valve 20b.

Synthetic signal generator 119 includes a poppet 123 and a spring 259a. Poppet 123 includes orifice or capillary passage 125 (FIG. 2A) that serves as a reverse flow means and functions as was described for groove 65 of the FIG. 1 embodiment.

One-way flow valve or check valve 122 includes ball or poppet 255a and spacer 126. Spacer 126 includes slot 127 at the lower end thereof to assure a fluid communication path from signal control port 260 to load signal passage 254b. One-way flow valve 122 includes groove 265 (FIG. 2B) in seat 256 that serves as a reverse flow means as was described for groove 65 of FIG. 1.

Synthetic signal generator or relief valve 121 includes a ball or poppet 255b and a spring 259b.

The first fluid flow path includes two branches. One branch includes hole 262, synthetic signal generator 119 and reverse flow means 125 in parallel relationship, and load signal passage 254a. The other branch includes hole 262, one-way flow valve 122 and reverse flow means 265 in parallel relationship, and load signal passage 254b.

The second fluid flow path includes hole 262, synthetic signal generator 121, attenuation signal passage 246, and reduced diameter portion 274.

Operation of the FIG. 2 configuration is as follows: sensor valve 114 moves to position 130a to discharge fluid from chamber 108 and thereby to increase the displacement of pump 102 and to position 130b to direct fluid from pump pressure conduit 266 into chamber 108 and thereby to decrease the displacement of pump 102, so that pump pressure is maintained at a predetermined differential above the pressure in signal conduit 272 as determined by the load of spring 118.

When valve spool 250 is in the standby position, as shown, fluid from pump pressure conduit 266 is supplied to signal conduit 272 by signal supply restrictor or orifice 24 for use as a signal fluid. This signal fluid is applied to operator 116b which functions as a signal chamber. The pressure magnitude of this signal fluid is equal to the pressure magnitude of the fluid pressure in sump 14c plus a predetermined increase in the pressure magnitude due to the flow resistance of synthetic signal generator 121. Thus, the displacement of pump 102 is controlled to maintain a pressure in pump pressure conduit 266 that is a function of the flow resistance of synthetic signal generator 121 and the load of spring 118. As an example, spring 118 may be selected so that the pump pressure will be 100 psi above the pressure in signal conduit 272, and synthetic signal generator 121 may be built to give a 400 psi resistance to fluid flow. Then the pressure of pump 102 would be 500 psi at standby.

If valve spool 250 is moved to the right to an operating position, a throttling orifice is formed by edge 132 of spool land 278 and edge 134 of spool bore 238, so that pump fluid in inlet port 240 is supplied to work port 242a and to fluid motor 28. The pressure drop across the throttling orifice will be a function of the load of spring 118 of sensor valve 114 and the flow resistance across relief valve 119. If relief valve 119 has a flow resistance of 150 psi and spring 118 controls the pressure of pump 102 to 100 psi above the pressure in signal conduit 272, then there will be 250 psi available to force fluid across the throttling orifice to work port 242a.

If valve spool 250 is moved to the left to a second operating position, a second throttling orifice is formed between inlet port 240 and work port 242b, the load actuating pressure of fluid motor 28 as sensed by work port 242b and load signal passage 254b will be applied to operator 116b so that there will be a pressure of 100 psi, as determined by the load of spring 118, available to force fluid across the throttling orifice to work port 242b.

Thus, the FIG. 2 configuration provides a standby pressure that is moderately high, for the operation of auxiliary equipment (not shown), a low pressure drop from the inlet port of the control valve to work port 242b to conserve power and to reduce heat rise, and an intermediate pressure drop from the inlet port of the control valve to work port 242a to increase the capacity of the valve to deliver a larger flow to work port 242a.

Referring again to FIG. 2, when valve spool 250 is moved to the right to an operating position, spool land 136 occludes the second fluid flow path between hole 262 and sump 14c; when valve spool 250 is moved to the left to an operating position, spool land 138 occludes the second fluid flow path; but when valve spool 250 is moved further to the left, to a float position, reduced diameter portion 140 reestablishes the second fluid flow path by communicating attenuation signal passage 246 with return port 244b.

In this float position, one-way flow valve 122 serves to prevent excessive loss of fluid from inlet port 240 to sump 14c via load signal passage 254b and attenuation signal passage 246; but groove 265 (FIG. 2B) provides a reverse flow means so that a small flow is available to pressure shift the balls 92a and 92b of FIG. 2 as was described for balls 92a and 92b of FIG. 1.

Figure 3A:
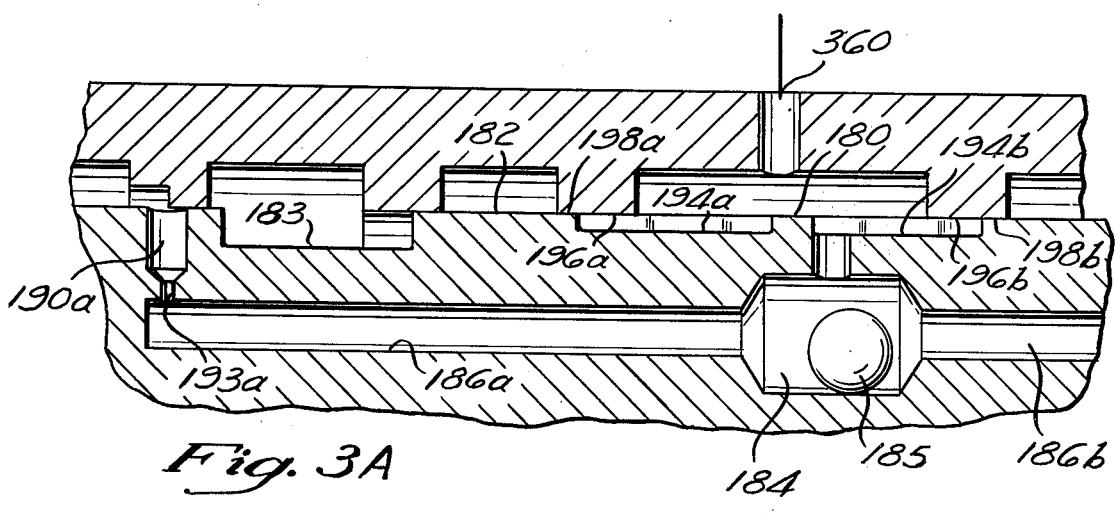
FIG. 3A is a partial and enlarged view of the control valve of FIG. 3.

The Embodiment of FIGS. 3 and 3A

Referring now to FIGS. 3 and 3A, load responsive system 310 includes directional control valve 326. Control valve 326 includes valve body 336 having spool bore 338 therein, and valve spool 350 being slidably fitted into bore 338.

Valve body 336 includes inlet ports 340a and 340b, work ports 342a and 342b, return ports 344a and 344b, and signal control port 360.

Valve spool or movable valving element 350 includes spool land 182, three-port logic valve 184 with one logic port thereof communicating with the outside diameter of spool land 182, longitudinal passages 186a and 186b each communicating with one logic port of logic valve 184, spool land 188 having radial passage 190a therein, spool land 192 having radial passage 190b therein, and orifices or synthetic signal generators 193a and 193b connecting radial passages 190a and 190b to longitudinal passages 186a and 186b, respectively.

Valve spool 350 includes longitudinal grooves or restricted flow paths 194a and 194b, which cooperate with bore lands 196a and 196b to provide valved signal supply restrictors 198a and 198b which are closed when valve spool 350 is in the standby position as shown.

When valve spool 350 is moved to the right, to an operating position, longitudinal groove 194b communicates with inlet port 340b to provide a restricted fluid flow path from inlet port 340b to signal control port 360 and thereby to provide fluid from pump pressure conduit 368 to signal conduit 372 for use as a signal fluid.

When valve spool 350 is moved to the left to an operating position, a restricted fluid flow path is established between inlet port 340a and signal control port 360 by longitudinal groove 194a, but when valve spool 350 is moved farther to the left to a float position, land portion 180 of spool land 182 blocks the restricted fluid flow path between inlet port 340a and signal control port 360.

When valve spool 350 is in the standby position as shown, longitudinal passages 186a and 186b cooperate with radial passages 190a and 190b to provide a fluid flow path that communicates signal control port 360 with one of the return ports 344 because ball or poppet type shuttle 185 cannot block both of the longitudinal passages, 186a and 186b, at the same time.

With valve spool 350 in the standby position, no fluid is being supplied from pump 12 to signal control port 360 by valved signal supply restrictors 198, whatever pressure has existed in signal conduit 372 and in signal chamber 34 is released to one of the return ports 344, and the bypass pressure of pump 12 is dependent only upon the force of spring 32.

When valve spool 350 is moved to the left to an operating position, valved signal supply restrictor 198a supplies fluid to signal control port 360, radial passage 190b moves to establish a fluid flow path to work port 342b and to sense the load actuating pressure of fluid motor 28, ball 185 moves to the left to block fluid communication from signal control port 360 to radial passage 190a and return port 344a, and fluid from signal control port 360 flows through orifice 193b to work port 342b. The result is that a synthetic signal pressure is developed in signal control port 360 which is dependent upon the ratio of the fluid conductance of restricted flow path 194a to the fluid conductance or orifice or synthetic signal generator 193b. The pressure of pump 12 is then controlled by the pressure magnitude of the synthetic signal pressure plus the load of spring 32.

When valve spool 350 moves farther to the left, to a float position, work port 342b is communicated to return port 344b by reduced diameter portion 181 of valve spool 350, radial passage 190b is communicated to return port 344b via work port 342b, work port 342a is communicated to return port 344a by reduced diameter portion 183 of valve spool 350, radial passage 190a remains in communication with return port 344a, and valved signal supply restrictor 198a is closed by land portion 180. The results are: both work ports are communicated to their respective return ports, no fluid is supplied to signal control port 360 by one of the valved signal supply restrictors 198a and 198b, whatever pressure has existed in signal conduit 372 and in signal chamber 34 is dissipated by a fluid flow path through one of the radial passages 190 to one of the return ports, 344a or 344b, and the pressure of pump 12 is dependent only upon the load of spring 32.

Notice that the logic means or logic valve 20b may be an integral part of the directional control valve, as in the FIGS. 1 and 2 embodiments, or separate therefrom, as in the FIG. 3 embodiment.

Notice that longitudinal passage 186a and radial passage 190a cooperate to form a longitudinal and radial passage means, which establishes first and second fluid flow paths from signal control port 360 to work port 342a and to return port 344a, respectively; and that, in like manner, longitudinal passage 186b and radial passage 190b cooperate to form a second longitudinal and radial passage means which establishes first and second fluid flow paths.

Notice also that synthetic signal generators 193a and 193b are interposed into both fluid flow paths, but synthetic signal generators 193a and 193b are effective to create a synthetic signal pressure only when there is fluid flowing through them. Thus, synthetic signal generators 193a and 193b do not raise the standby pressure of pump 12 because no fluid is being supplied to signal control port 360 by valved signal supply restrictors 198a and 198b and there is no fluid flowing through synthetic signal generators 198a and 198b.

Referring now to FIGS. 1 – 3, both relief valves and orifices have been shown and described as being used for synthetic signal generators; and both provide a predetermined and constant differential pressure for the flow of signal fluid from the signal supply restrictor, 24 or 198a, to a work port; since the fluid responsive means, 16 or 120, maintains a constant differential pressure across the signal supply restrictor.

Referring again to FIGS. 1 and 2, it should be noticed that the inclusion of the reverse flow means (groove 65 of FIG. 1B, orifice 125 of FIG. 2A, or groove 265 of FIG. 2B) does not increase the flow of pump fluid from one directional control valve, through the logic means 20, and then through a synthetic signal generator of another directional control valve; because the logic means is effective to communicate the signal supply restrictor and the signal chamber with the signal control port of one directional control valve while isolating all other signal control ports from the signal supply restrictor and the signal chamber.

Referring again to FIG. 3, each control valve includes a separate signal supply restrictor 198a; and cross flow of signal fluid, from one control valve to another, is prevented by the logic means as has been described above for FIGS. 1 and 2.

However, should circuitry be used in which the flow rate of the signal fluid is not constant, the use of the relief valve for a synthetic signal generator would be preferable over the orifice; since the relief valve inherently has a lower increase in pressure differential thereacross for an incremental increase in flow than does an orifice.

Unique Features of the Directional Control Valves

The directional control valves of FIGS. 1 and 2 are unique in that they both include a signal control port, a load signal passage being connected to the signal control port and intercepting the spool bore intermediate of an inlet port and a work port, an attenuation signal passage being connected to the signal control port and intercepting the spool bore proximal to a return port and distal from the work port and the inlet port, a reduced portion on the outside of the valve spool for selectively establishing fluid communication between the attenuation signal passage and the return port, and a synthetic signal generator interposed in a fluid flow path that includes either the load signal passage or the attenuation signal passage.

More briefly stated, the directional control valves of FIGS. 1 and 2 are unique in that they selectively establish a first fluid flow path from a signal control port to a work port, they selectively establish a second fluid flow path from the signal control port to return port means that is proximal to a work port and distal from the inlet port, and they interpose a synthetic signal generator in one of these fluid flow paths.

The directional control valve of FIG. 3 is unique in that first and second fluid flow paths are selectively established from a signal control to a work port and a return port, respectively, a synthetic signal generator is interposed in one of the fluid flow paths, and means is provided for selectively and restrictively communicating the inlet port to the signal control port.

Additional Comments

It should be understood that a plurality of separate sumps have been illustrated as a matter of convenience. In like manner, separate return ports have been illustrated in the control valves although, in general practice in the art, these return ports are interconnected in the body castings; and the manner or place of connecting the return ports is not an inventive part of the present invention.

In regard to relative flow capacities of the orifices and restrictors, restrictors 24 and 194 are normally made in the order of 1/32 to 1/16 inches in diameter so that they have a flow area of .00077 to .0031 square inches. Orifice type synthetic signal generators, such as orifice 64 of FIG. 1A and orifice 193a of FIG. 3, are sized in relation to the cross sectional flow area of the restrictors to give the desired predetermined pressure increase as fluid flows to the work port having the highest load actuating pressure.

Referring back now to FIGS. 1 and 3, it is desirable to limit the standby pressure of the system to approximately 30 psi in order to minimize the power loss and heat rise under standby conditions, but a pressure differential of 120 psi across the throttling orifice of the control valve, from inlet port to a work port, is desirable to increase the capacity of the control valve to deliver fluid to a work port and to a fluid motor.

Since flow across an orifice increases as the square root of the pressure differential across the orifice, the maximum flow from the inlet port to a work port of the control valve is doubled by increasing the pressure differential across the throttling orifice from 30 to 120 psi. This means that, ideally, the flow resistance of the orifice or the relief valve should be three times the standby pressure.

It was shown that a relief valve may be used as a synthetic signal generator. The relief valve may be of the type that includes a spring loaded ball or poppet with the pressure drop across the ball or poppet being determined by the spring load. The same type of device is used as a check valve. However, for use as a synthetic signal generator, the spring load must be sufficient to provide a significant pressure differential across the ball or poppet.

Ordinarily, for this increase to be significant, the increase in pressure magnitude would need to be at least equal to the standby pressure when a fixed displacement pump is used. That is, if a system has a standby pressure of 50 psi, and if a relief valve or a check valve increases the pressure magnitude of the signal fluid by at least 50 psi, then the relief valve or the check valve functions as a synthetic signal generator.

When a variable displacement pump is used, for this increase to be significant, a relief valve or a check valve in a second fluid flow path should increase the standby pressure by at least 100% over the differential pressure across the throttling orifice from the inlet port to one work port.

When a variable displacement pump is used, and it is desired to increase the pressure differential across the throttling orifice to one work port, any relief valve or other flow restrictor that doubles the differential pressure across the one work port can be considered to be a synthetic signal generator.

That is, any flow restrictor that produces this 100% change between standby pressure and the differential pressure across a throttling orifice serves to function as a synthetic signal detector.

Having described several embodiments of my invention, many variations will be apparent to those skilled in the art, so my invention should be considered to include all variations covered by the appended claims.

What is claimed is:

1. A load responsive hydraulic system of the type which includes a source of pressurized fluid having a pump (12 of FIGS. 1 & 3, or 102 of FIG. 2) and a sump (14), a fluid actuated device (28), a directional control valve (26 of FIG. 1, 226 of FIG. 2, or 326 of FIG. 3) having a movable valving element (50, 250, or 350) and having both an operating position wherein fluid from said pump is supplied to said fluid actuated device at the load actuating pressure thereof and a standby position wherein said fluid actuated device is isolated from said pump, a fluid responsive means (16 of FIGS. 1 & 3, or 120 of FIG. 2) having a signal chamber (34 of FIGS. 1 & 3, or 116b of FIG. 2) therein and being effective to control the pressure and the effective output of said pump in response to the pressure magnitude of a signal fluid supplied to said signal chamber, the improvement of which comprises:

a. signal control means (62 + 54a + 46 + 74 of FIG. 1, 262 + 254a + 246 + 274 of FIG. 2, or 184 + 186a + 190a of FIG. 3) including a signal control port (60, 260, or 360) in said control valve and including said valving element, for establishing a first fluid flow path (incl. 54a of FIG. 1, 254a of FIG. 2, or 184 + 186a + 190a of FIG. 3) which communicates said signal control port with said fluid actuated device, for sensing said load actuating pressure when said control valve is in said operating position, for establishing a second fluid flow path (incl. 46 + 74 of FIG. 1, 246 + 274 of FIG. 2, or 184 + 186a + 190a of FIG. 3) which communicates said signal control port with said sump, and for sensing the fluid pressure in said sump when said control valve is in said standby position;

b. logic means (20b) having a first logic port (95b) connected to said signal chamber, having a second logic port (94b) connected to said signal control port, and having a third logic port (90b) adapted for connection to a fluid pressure, for establishing fluid communication from said first logic port to one of the other two of said logic ports having the higher fluid pressure therein, and for blocking fluid communication from said first logic port to the one of said other two logic ports having the lower fluid pressure therein;

c. a signal supply restrictor (24 of FIGS. 1 & 2, or 198a of FIG. 3) being connected to said pump to receive fluid therefrom and being connected to said logic means to supply fluid to said signal chamber for use as said signal fluid; and d. a synthetic signal generator (52 of FIG. 1, 64 of FIG. 1A, 119 or 121 of FIG. 2, or 193a of FIGS. 3 & 3A) being interposed into one of said fluid paths and imposing a predetermined flow resistance to fluid flow through said one fluid flow path;

e. whereby said first fluid flow path establishes fluid communication from said signal control port to said fluid actuated device to sense said load actuating pressure and thereby to apply said load actuating pressure to said second logic port when said directional control valve is in said operating position, said logic means establishes fluid communication from said signal chamber to said signal control port whenever the fluid pressure in said second logic port is greater then any fluid pressure applied to said third logic port, said signal supply restrictor is effective to supply fluid from said pump to said signal chamber and to supply fluid from said pump to said fluid actuated device through said first fluid flow path, and said synthetic signal generator is effective to increase the pressure magnitude of said signal fluid in said signal chamber to a predetermined value above the pressure magnitude of the load actuating pressure as sensed by said first fluid flow path.

2. A system as claimed in claim 1, in which said pump comprises a fixed displacement pump (12) and said fluid responsive means comprises a differential pressure actuated bypass valve (16).

3. A system as claimed in claim 1, in which said pump comprises a variable displacement pump (102) and said fluid responsive mechanism comprises a displacement control mechanism (120).

4. A system as claimed in claim 1, in which said one fluid flow path comprises said first fluid flow path (to a work port 42a, 242a, or 342a), whereby said synthetic signal generator (52 of FIG. 1, 64 of FIG. 1A, 119 of FIG. 2, or 193a of FIG. 3) is effective to control said pressure magnitude of said signal fluid to said predetermined value when said control valve is in said operating position.

5. A system as claimed in claim 1, in which said one fluid flow path comprises said second fluid flow path (to return port 244b), whereby said synthetic signal generator (121) is effective to control said pressure magnitude of said signal to said predetermined level when said control valve is in said standby position.

6. A system as claimed in claim 1, which includes a pilot relief valve (22) being connected to said signal chamber (34 of FIGS. 1 & 3, or 116b of FIG. 2) and being effective to limit the maximum fluid pressure of said signal fluid.

7. A system as claimed in claim 1, in which said control valve includes a valve body having a spool bore therein, said valving element comprises a valve spool being slidably fitted into said bore and one of said fluid flow paths comprises a longitudinal passage (186a) in said valve spool.

8. A system as claimed in claim 1, in which said control valve includes a valve body having a spool bore therein, said valving element comprises a valve spool being slidably fitted into said bore, and both of said fluid flow paths comprise a longitudinal passage (186a) in said valve spool.

9. A system as claimed in claim 1, in which said synthetic signal generator comprises an orifice (64 of FIG. 1A, or 193a of FIG. 3 & 3A).

10. A system as claimed in claim 1, in which said synthetic signal generator comprises a relief valve (52 of FIG. 1, 119 of FIG. 2, or 121 of FIG. 2).

11. A system as claimed in claim 1, in which said control valve includes a valve body having a spool bore therein, said valving element comprises a valve spool being slidably fitted in said bore, said one fluid flow path comprises a passage (186a) in said valve spool, and said synthetic signal generator (193a) is located in said valve spool.

12. A system as claimed in claim 1, in which said control valve comprises a valve body having a spool bore therein and a return port (44a or 244b) in said body intersecting said bore and being connected to said sump, said valving element comprises a valve spool being slidably fitted in said bore, and said second fluid flow path comprises an attenuation signal passage (46 or 246) in said valve body intercepting said bore, and a reduced diameter portion (74 or 274) of said valve spool providing fluid communication between said attenuation signal passage and said return port when said control valve is in said standby position, whereby said attenuation passage, said reduced diameter portion, and said return port cooperate to provide said second fluid flow path.

13. A system as claimed in claim 1, in which said control valve comprises a valve body having a spool bore therein, said valving element comprises a valve spool being slidably fitted in said bore, said first fluid flow path comprises a load signal passage (54a or 54b of FIG. 1, or 254a or 254b of FIG. 2) being connected to said signal control port and intercepting said bore, and said second fluid flow path comprises an attenuation signal passage (46 of FIG. 1, or 246 of FIG. 2) being connected to said signal control port and intercepting said bore.

14. A system as claimed in claim 1, of the type which includes a second fluid actuated device being operable at a second load actuating pressure, and a second directional control valve having an operating position wherein fluid from said pump is supplied to said second device at said second load actuating pressure and having a standby position wherein said pump is isolated from said second device, the improvement of which comprises second signal control means in said second directional control valve, including a second signal control port (same as 60, 260, or 360) connected to said third logic port (90b), for establishing another second fluid flow path which communicates with said sump and for sensing the fluid pressure in said sump when said second directional control valve is in said standby position.

15. A system as claimed in claim 1, of the type which includes a second fluid actuated device being operable at a second load actuating pressure, and a second directional control valve having an operating position wherein fluid from said pump is supplied to said second device at said second load actuating pressure and having a standby position wherein said pump is isolated from said second device, the improvement of which comprises second signal control means in said second directional control valve, including a second signal control port (same as 60, 260, or 360) connected to said third logic port (90b), for establishing another first fluid flow path with communicates with said second fluid actuated device and for sensing said second load actuating pressure when said second directional control valve is in said operating position.

16. A system as claimed in claim 1, in which said control valve is of the type having a body with a spool bore therein, a work port (42a of FIG. 1, or 242a of FIG. 2) intersecting said bore, a return port (44a of FIG. 1 or 244a of FIG. 2) intersecting said bore, an inlet port (40 of FIG. 1 or 240 of FIG. 2) intersecting said bore, and said valving element comprises a valve spool in said bore being movable from said standby position to said operating position, the improvement of which comprises said signal control means including a load signal passage (54a of FIG. 1 or 254a of FIG. 2) which provides a portion of said first fluid flow path and which intercepts said bore intermediate of said inlet port and said work port.

17. A system as claimed in claim 1, in which said system includes a pump pressure conduit (66 + 68, 266 + 268, or 366 + 368) connecting said pump to said control valve and a differential pressure actuated flow valve (18) being interposed in said pump pressure conduit for controlling fluid flow therethrough, being connected to said pump pressure conduit (68, 268, or 368) for control by the fluid pressure therein and being connected to said signal control means (signal control port 60, 260 or 360; or hole 62 of FIG. 1 via conduit 100) for control by a fluid pressure therein.

18. A system as claimed in claim 17, in which the connection of said differential pressure actuated flow valve (18) to said signal control means comprises the connection of said differential pressure actuated flow valve to said first fluid flow path at a point (hole 62 via conduit 100) wherein said flow valve is controlled by said load actuating pressure (valving element 50 moved to the right and load signal passage 54a communicating with work port 42a).

19. A system as claimed in claim 17, in which the connection of said differential pressure actuated flow valve (18) to said signal control means comprises the connection of said differential pressure actuated flow valve to said first fluid flow path at a point (signal control port 60, 260, or 360) wherein said flow valve is controlled by said signal fluid and said signal fluid is of a pressure magnitude equal to said load actuating pressure increased by said predetermined flow resistance.

20. A system as claimed in claim 17, in which the connection of said differential pressure actuated flow valve to said signal control means comprises the connection of said differential pressure actuated flow valve to said second fluid flow path at a point (signal control port 60, 260, or 360) wherein said flow valve is controlled by the fluid pressure in said sump when said control valve is in said standby position.

21. A system as claimed in claim 1, in which said fluid responsive means (16 of FIGS. 1 & 3, or 120 of FIG. 2) is effective to control said pressure of said pump (12 of FIGS. 1 & 3, or 102 of FIG. 2) to a predetermined pressure magnitude above the pressure magnitude of said signal fluid supplied to said signal chamber (34 of FIGS. 1 & 3, or 116b of FIG. 2) and said synthetic signal generator (52 of FIG. 1, 64 of FIG. 1A, 119 or 121 of FIG. 2, or 193a of FIGS. 3 & 3A) is effective to increase said pressure sensed by said one fluid flow path by a larger pressure magnitude than said predetermined pressure magnitude at which said fluid responsive means controls said pump pressure above the fluid pressure in said signal chamber.

22. A system as claimed in claim 1, in which said synthetic signal generator (52 of FIG. 1, or 119 of FIG. 2) functions as a one-way flow valve preventing fluid flow from said work port (42a or 242a) to said logic means (20b), and said system includes reverse flow means (groove 65 of FIG. 1B, or orifice 125 of poppet 123) for permitting fluid flow from said work port to said logic means.

23. A system as claimed in claim 22, in which said synthetic signal generator comprises a relief valve (52) having a poppet (55) and a seat (56), and said reverse flow means comprises a groove (65) preventing said poppet from effectively sealing against said seat.

24. A system as claimed in claim 22, in which said synthetic signal generator comprises a relief valve (119) having a poppet (123), and said reverse flow means comprises an orifice (125) in said poppet.

25. A system as claimed in claim 1, in which said control valve is of the type having a body with a spool bore therein, first and second work ports (42a & 42b, 242a & 242b, or 342a & 342b) intersecting said bore, an inlet port (40 of FIG. 1, 240 of FIG. 2, or 340a or 340b of FIG. 3) intersecting said bore, and said valving element comprises a valve spool in said bore being movable from said standby position to said operating position and to a second operating position, the improvement which comprises a float position to which said valve spool is movable wherein both of said work ports ares communicated (by 86 + 45 of FIG. 1, 286 + 274 of FIG. 2, or 183 + 181 of FIG. 3) to respective ones of said work ports.

26. A system as claimed in claim 25, in which said control valve includes means (80 of FIG. 1, or 140 of FIG. 2) for reestablishing said second fluid flow path from said signal control port (60 or 260) to said sump (14) when said control valve is in said float position.

27. A system as claimed in claim 26, in which said control valve includes means (one-way flow valve 122) for restricting fluid flow from said inlet port (240) through said first fluid flow path (incl. load signal passage 254b) to said signal control port (260) and to said sump (41) when said valve spool is in said float position.

28. A system as claimed in claim 25, in which said first fluid flow path comprises a load signal passage (254b) intercepting said bore, said valve spool communicates (via 288) said inlet port (240) with said load signal passage when said valve spool is in said float position, said control valve includes a one-way flow valve (122) interposed in said first fluid flow path preventing fluid flow from said inlet port to said logic means (20b), and reverse flow means (orifice 125 of poppet 123) for permitting restricted fluid flow from said inlet port through said first fluid flow path to said logic means;

whereby said one-way flow valve and said reverse flow means cooperate to restrict fluid loss by flow from said inlet port to said signal control port (260) through said first fluid flow path and to said sump (14c) through said second fluid flow path when said control valve is in said float position, and to permit restricted fluid flow from one of said work ports (242b) to said second logic port (94b) for pressure actuation of said logic means when said control valve is in one of said operating positions (valve spool to the left).

29. A system as claimed in claim 1, in which said control valve is of the type having a body with a spool bore therein, first and second work ports (42a & 42b, 242a & 242b) intersecting said bore, first and second return ports (44a & 44b, or 244a & 244b) intersecting said bore, an inlet port (40 or 240) intersecting said bore, and said valving element comprises a valve spool (50 or 250) in said bore being movable from said standby position to said operating position and to a second operating position, the improvement in which said signal control means comprises:
  a. first and second load signal passages (54a & 54b, or 254a & 254b) each having one end thereof connected to said signal control port (60 or 260) and each intercepting said bore intermediate of one of said work ports and one of said return ports;
  b. an attenuation signal passage (46 or 246) having one end thereof connected to said signal control port and intercepting said bore proximal to one of said return ports and distal from both of said work ports; and
  c. said valve spool includes a reduced diameter portion (74 or 274) that communicates said attenuation signal passage with said proximal return port (44a or 244b) when said valve spool is in said standby position.

30. In a load responsive hydraulic system of the type which includes a source of pressurized fluid having a pump (12 of FIG. 1 or 102 of FIG. 2) and a sump (14), a fluid actuated vehicle (28), a directional control valve (26 of FIG. 1 or 226 of FIG. 2) having a movable valving element (50 or 250) and having both an operating position wherein fluid from said pump is supplied to said fluid actuated device at the load actuating pressure thereof and a standby position wherein said fluid actuated device is isolated from said pump, a fluid responsive means (16 or FIG. 1 or 120 of FIG. 2) having a signal chamber (34 of FIG. 1 or 116b of FIG. 2) therein and being effective to control the pressure and the effective output of said pump in response to the pressure magnitude of a signal fluid supplied to said signal chamber, the improvement which comprises:
  a. signal control means (62 + 54a + 46 + 74 of FIG. 1, or 262 + 254a + 246 + 274 of FIG. 2) including a signal control port (60 or 260) in said control valve and including said valving element, for establishing a first fluid flow path (incl. 54a of FIG. 1, or 254a of FIG. 2) which communicates said signal control port with said fluid actuated device, for sensing said load actuating pressure when said control valve is in said operating position, for establishing a second fluid flow path (incl. 46 + 74 of FIG. 1, or 246 + 274 of FIG. 2) which communicates said signal control port with said sump, and for sensing the fluid pressure in said sump when said control valve is in said standby position;
  logic means (20b), having a first logic port (95b) connected to said signal chamber, having a second logic port (94b) connected to said control port, and having a third logic port (90b) adapted for connection to a fluid pressure, for establishing reversible fluid communication between said first logic port and the one of the other two of said logic ports having the higher fluid pressure therein, and for blocking fluid communication between said first logic port and the one of said other two logic ports having the lower fluid pressure therein;
  c. a signal supply restrictor (24) being connected to said pump to receive fluid therefrom and being connected to said signal chamber to supply fluid thereto for use as said signal fluid; and
  d. a synthetic signal generator (52 of FIG. 1, 64 of FIG. 1A, or 119 or 121 of FIG. 2) being interposed into one of said fluid flow paths and imposing a predetermined flow resistance to fluid flow through said one fluid flow path;
  e. whereby said first fluid flow path establishes fluid communication from said signal control port to said fluid actuated device to sense said load actuating pressure and thereby to apply said load actuating pressure to said second logic port when said directional control valve is in said operating position, said logic means establishes fluid communication from said signal chamber to said signal control port whenever the fluid pressure in said second logic port is greater than any fluid pressure applied to said third logic port, said signal supply restrictor is effective to supply fluid from said pump to said signal chamber and to supply fluid from said pump to said fluid actuated device through said first fluid flow path, and said synthetic signal generator is effective to increase the pressure magnitude of said signal fluid in said signal chamber to a predetermined value above the pressure magnitude of the load actuating pressure as sensed by said first fluid flow path.

31. A load responsive hydraulic system of the type which includes a source of pressurized fluid having a pump (12) and a sump (14), a fluid actuated device (28), a directional control valve (326) having a movable valving element (350) and having both an operating position wherein fluid from said pump is supplied to said fluid actuated device at the load actuating pressure thereof and a standby position wherein said fluid actuated device is isolated from said pump, a fluid responsive means (16) having a signal chamber (34) therein and being effective to control the pressure and the effective output of said pump in response to the pressure magnitude of a signal fluid supplied to said signal chamber, the improvement of which comprises:
  a. signal control means (184 + 186a + 190a) including a signal control port (360) in said control valve and including said valving element for establishing a first fluid flow path (incl. 184 + 186a + 190a) which communicates said signal control port with said fluid actuated device, for sensing said load actuating pressure when said control valve is in said operating position, for establishing a second fluid flow path (incl. 184 + 186a + 190a) which communicates said signal control port with said sump, and for sensing the fluid pressure in said sump when said control valve is in said standby position;
  b. logic means (20b), having a first logic port (95b) connected to said signal chamber, having a second logic port (94b) connected to said signal control port, and having a third logic port (90b) adapted for connection to a fluid pressure, for establishing fluid communication from said first logic port to the one of the other two of said logic ports having the higher fluid pressure therein, and for blocking fluid communication from said first logic port to the one of said other two logic ports having the lower fluid pressure therein;
  c. a valved signal supply restrictor (198a), including cooperating portions (194a and 196a) of said control valve and being connected to said pump (via inlet port 340a) and to said signal control port, for establishing a restricted flow path from said pump to said signal control port when said control valve is in said operating position, and for isolating said pump from said signal control port when said control valve is in said standby position; and
  d. a synthetic signal genertor (193a) being interposed in said first fluid flow path and imposing a predetermined flow resistance to fluid flow through said first fluid flow path;

e. whereby fluid is supplied from said pump to said signal control port for use as said signal fluid, said first fluid flow path is established and said load actuating pressure is sensed by said first fluid flow path, said signal fluid is pressurized to a predetermined value above the pressure magnitude of said load actuating pressure to produce a synthetic signal by flowing through said synthetic signal generator and through said first fluid flow path to said fluid actuated device, and said synthetic signal is applied to said signal chamber to control said fluid responsive means and to control the pressure magnitude of said pump to a predetermined pressure magnitude above said synthetic signal, when said control valve is in said operating position and said load actuating pressure is greater than any fluid pressure applied to said third logic port.

32. A system as claimed in claim 31, in which said control valve is of the type which includes a body with a spool bore therein, first and second return ports (344a & 344b) intersecting said bore and being connected to said sump, first and second work ports (342a & 342b) itersecting said bore intermediate of said return ports and being connected to said fluid actuated device, first and second inlet ports (340a & 340b) intersecting said bore intermediate of said work ports and being connected to said pump, and said valving element comprises a valve spool being slidably fitted in said bore and being movable to both said operating position and to a second operating position, the improvement in which said signal control means comprises:
  a. said signal control port (360) intersecting said bore intermediate of said inlet ports;
  b. first longitudinal and radial passage means (186a + 190a) in said valve spool selectively communicating with said first return port (344a) and with said first work port (342a);
  c. second longitudinal and radial passage means (186b + 190b) in said valve spool selectively communicating with said second return port (344b) and with said second work port (342b); and
  d. means (logic valve 184) in said valve spool for selectively communicating said signal control port with said first longitudinal and radial passage means and with said second longitudinal and radial passage means as said valve spool is moved to respective ones of said operating positions.

33. A system as claimed in claim 32, in which said selective communication means comprises a three-port valve (184) having one logic port thereof operatively connected to said signal control port (360), having a second logic port thereof connected to one of said longitudinal and radial passage means (186a + 190a), and having the third logic port thereof connected to the other of said longitudinal and radial passage means (186b + 190b).

34. A system as claimed in claim 32, in which said synthetic signal generator (193a or 193b) is interposed in one of said longitudinal and radial passage means (186a + 190a, or 186b + 190b).

35. A system as claimed in claim 34 in which said synthetic signal generator comprises an orifice (193a or 193b).

36. A system as claimed in claim 31, in which said control valve is of the type which includes a body with a spool bore therein, first and second return ports (344a & 344b) intersecting said bore and being connected to said sump, first and second work ports (342a & 342b) intersecting said bore intermediate of said return ports and being connected to said fluid actuated device, first and second inlet ports (340a & 340b) intersecting said bore intermediate of said work ports and being connected to said pump, the improvement which comprises said valved signal supply restrictor (198a) comprising a longitudinal groove (194a) in said valve spool (350) and a cooperating portion (196a) of said bore (338).

37. A system as claimed in claim 31 of the type which includes a second fluid actuated device being operable at a second load actuating pressure, and a second directional control valve having an operating position wherein fluid from said pump is supplied to said second device at said second load actuating pressure and having a standby position wherein said pump is isolated from said second device, the improvement of which comprises:
  second signal control means in said second control valve including a second signal control port (similar to 360) connected to said third logic port (90b) for establishing another first fluid flow path which communicates with said second fluid actuated device, for sensing said second load actuating pressure when said second control valve is in said operating position, for establishing another second fluid flow path which communicates with said sump, and for sensing the fluid pressure in said sump when said second control valve is in said standby position.

38. A load responsive hydraulic system of the type which includes a source of pressurized fluid having a pump (12) and a sump (14), a fluid actuated device (28), a directional control valve (326) having a movable valving element (350) and having both an operating position wherein fluid from said pump is supplied to said fluid actuated device at the load actuating pressure thereof and a standby position wherein said fluid actuated device is isolated from said pump, a fluid responsive means (16) having a signal chamber (34) therein and being effective to control the pressure and the effective output of said pump in response to the pressure magnitude of a signal fluid supplied to said signal chamber, the improvement of which comprises:
  a. signal control means (184 + 186a + 190a) including a signal control port (360) in said control valve and including said valving element for establishing a first fluid flow path (incl. 184 + 186a + 190a) which communicates said signal control port with said fluid actuated device, for sensing said load actuating pressure when said control valve is in said operating position, for establishing a second fluid flow path (incl. 184 + 186a + 190a + 342a) which communicates said signal control port with said sump, and for sensing the fluid pressure in said sump when said control valve is in said standby position;
  b. logic means (20b), having a first logic port (95b) connected to said signal chamber, having a second logic port (94b) connected to said signal control port, and having a third logic port (90b) adapted for connection to a fluid pressure, for establishing fluid communication between said first logic port and the one of the other two of said logic ports having the higher fluid pressure therein, and for blocking fluid communication between said first logic port and the one of said other two logic ports having the lower fluid pressure therein; and c. means (valved signal supply restrictor 198a) for supplying pressurized fluid from said pump to said logic means through said second logic port (94b) of said logic means (20b) when said control valve is in said operating position;

d. whereby said pump provides pressurized fluid to said second logic port for use as said higher fluid pressure when said control valve is in said operating position.

39. A system as claimed in claim 38, in which said means for supplying pressurized fluid from said pump to said logic means (20b) comprises a valved signal supply restrictor (198a).

40. A system as claimed in claim 39, in which said control valve is of the type that includes a valve body having a spool bore therein, a valve spool (350) slidably fitted in said bore, and an inlet port (340a) intersecting said bore, the improvement which comprises:

said means for supplying pressurized fluid from said pump to said logic means (20b) comprising passage means in said valve spool (groove 194a) for selectively communicating said inlet port with said signal control port (360).

41. A system as claimed in claim 40, in which said passage means comprises a groove (194a) in said valve spool.

42. A system as claimed in claim 38, of the type which includes a second fluid actuated device being operable at a second load actuating pressure, a second directional control valve having an operating position wherein fluid from said pump is supplied to said second fluid actuated device at said second load actuating pressure and having a standby position wherein said pump is isolated from said second fluid actuated device, the improvement of which comprises:

second signal control means in said second control valve including a second signal control port (similar to 360) connected to said third logic port (90b) for establishing another first fluid flow path which communicates with said second fluid actuated device, for sensing said second load actuating pressure when said second control valve is in said operating position, for establishing another second fluid flow path which communicates with said sump, and for sensing the fluid pressure in said sump when said second control valve is in said standby position.

43. A system as claimed in claim 38, which includes a pilot relief valve (22) being connected to said signal chamber (34) and being effective to limit the maximum fluid pressure of said signal fluid.

44. A system as claimed in claim 38, in which said system includes a pump pressure conduit (366 + 368) connecting said pump to said control valve, the improvement which comprises a differential pressure actuated flow valve (18) being interposed in said pump pressure conduit for controlling fluid flow therethrough, being connected to said pump pressure conduit (368) for control by the fluid pressure therein and being connected to said signal control means (signal control port 360) for control by a fluid pressure therein.

45. A system as claimed in claim 38, in which said pump comprises a fixed displacement pump and said fluid responsive means comprises a differential pressure actuated bypass valve (16).

46. A system as claimed in claim 38, in which said control valve includes a valve body having a spool bore therein, said valving element comprises a valve spool being slidably fitted in said bore and one of said fluid flow paths comprises a longitudinal passage (186a) in said valve spool.

47. A system as claimed in claim 38, in which said control valve includes a valve body having a spool bore therein, said valving element comprises a valve spool being slidably fitted in said bore, and both of said fluid flow paths comprise a longitudinal passage (186a) in said valve spool.

48. In a system as claimed in claim 38, in which said control valve is of the type which includes a body with a spool bore therein, an inlet port (340a) intersecting said bore and being connected to said pump, a work port (342a) intersecting said bore and being connected to said fluid actuated device, a return port (344a) intersecting said bore adjacent to said intersection of said work port and said bore and being connected to said sump, and said valving element comprises a valve spool bore slidably fitted into said bore, the improvement which comprises said first and second fluid flow paths including a longitudinal passage (186a) in said valve spool which communicates with said signal control port (360); and a radial passage (190a) in said valve spool which communicates with said longitudinal passage and which selectively communicates with said work port and said return port to establish said first and second fluid flow paths, respectively.

49. A system as claimed in claim 38, in which said control valve is of the type which includes a body with a spool bore therein, first and second return ports (344a & 344b) intersecting said bore and being connected to said sump, first and second work ports (342a & 342b) intersecting said bore intermediate of said return ports and being connected to said fluid actuated device, first and second inlet ports (340a & 340b) intersecting said bore intermediate of said work ports and being connected to said pump, and said valving element comprises a valve spool being slidably fitted in said bore and being movable to both said operating position and to a second operating position, the improvement in which said signal control means comprises:

a. said signal control port (360) intersecting said bore intermediate of said inlet ports (340a and 340b);

b. first longitudinal and radial passage means (186a + 190a) in said valve spool selectively communicating with said first return port (344a) and with said first work port (342a);

c. second longitudinal and radial passage means (186b + 190b) in said valve spool selectively communicating with said second return port (344b) and with said second work port (342b); and d. means (logic valve 184) in said valve spool for selectively communicating said signal control port with said first longitudinal and radial passage means and with said second longitudinal and radial passage means as said valve spool is moved to respective ones of said operating positions.

50. A system as claimed in claim 49, in which said selective communication means comprises a three-port logic valve (184) having one logic port thereof operatively connected to said signal control port (360), having a second logic port thereof connected to one of said longitudinal and radial passage means (186a + 190a) and having the third logic port thereof connected to the other of said longitudinal and radial passage means (186b + 190b).

51. A system as claimed in claim 50, in which said three-port logic valve (184) includes a poppet type shuttle (185).

52. A directional control valve of the type which includes a body having an inlet port means (340a) and a work port (342a), return port means (344a) in said body, and a movable valving element selectively communicating said work port with said inlet port means and with said return port means, the improvement which comprises:
   a. a signal control port (360) in said body communicating with said valving element;
   b. means (186a + 190a) for establishing a first fluid flow path from said signal control port to said work port when said valving element communicates said inlet port means to said work port, and for selectively establishing a second fluid flow path from said signal control port to said return port means; and
   c. means (valved signal supply restrictor 198a) for establishing a restricted flow path from said inlet port means to said signal control port when said valving element communicates said inlet port means to said work port.

53. A control valve as claimed in claim 52, in which said control valve is of the type having a second work port (342b), said movable valving element is movable in a first direction to a first operating position wherein said communication of first said work port (342a) with said inlet port means (340a) is established, is movable in a second direction wherein said work port is communicated with said inlet port means (340b) and first said work port is communicated with said return port means (344a), and is movable to a third position wherein both of said work ports are communicated with said return port means (344a + 344b), the improvement which comprises:
   means for obviating said restricted flow path from said inlet port means to said signal control port when said movable valving element is in said third position.

54. A control valve as claimed in claim 52, in which said means for establishing one of said fluid flow paths comprises a longitudinal passage (186a) in said valving element.

55. A control valve as claimed in claim 52, in which said means for establishing a flow path from said inlet port (340a) to said signal control port (360) comprises passage means (groove 194a) in said valving element.

56. A control valve as claimed in claim 52, in which said control valve is of the type having a second work port (342b), the improvement which comprises:
   a. said means for selectively establishing both of said fluid flow paths comprises first and second longitudinal passages in said valve spool (186a & 186b), first and second radial passages (190a & 190b) each being in fluid communication with one of said longitudinal passages and each selectively communicating with one of said work ports (342a or 342b) and said return port means (344a + 344b), and a three-port logic valve (184) in said valving element having a first logic port in fluid communication with said signal control port (360) and having second and third logic ports in fluid communication with respective ones of said longitudinal passages; and
   b. said means for establishing a flow path from said inlet port to said signal control port comprises a groove (194a) in said movable valving element and a cooperating portion (196a) of said body.

57. A control valve as claimed in claim 52, in which said means for establishing a flow path from said inlet port to said signal control port provides a flow path having a cross sectional area of less than one-one hundredth of a square inch at the smallest point thereof.

58. A control valve as claimed in claim 52, in which said control valve includes a synthetic signal generator (193a) interposed in one of said fluid flow paths.

59. A directional control valve of the type which includes a body (336) having a spool bore (338) therein, having return port means (344a) intersecting said bore, having an inlet port (340a) intersecting said bore in spaced relationship to said return port means, and having a work port (342a) intercepting said bore intermediate of said inlet port and said return port means, and a valve spool being slidably fitted in said bore and being movable from a standby position wherein said work port is isolated from said inlet port and said return port to an operating position wherein said work port is communicated with said inlet port, the improvement which comprises:
   a. a signal control port (360) in said body intercepting said bore proximal to said inlet port and distal from said work port and said return port means;
   b. logic means (20b), having a first logic port (95b), having a second logic port (94b) connected to said signal control port, and having a third logic port (90b) for connection to a fluid pressure, for establishing fluid communication between said first logic port and the one of the two other of said logic ports having the highest fluid pressue therein;
   c. means, comprising a longitudinal passage (186a) and a radial passage (190a) in said valve spool, for communicating said signal control port with said return port means when said valve spool is in said standby position, and for communicating said signal control port with said work port when said valve spool is in said operating position; and
   d. means (groove 194a), in said valve spool, for establishing a restricted flow path from said inlet port to said signal control port when said valve spool is in said operating position, whereby said inlet port is communicated with said second logic port.

60. A control valve as claimed in claim 59, in which said means for establishing fluid communication from said inlet port (340a) to said signal control port (360) comprises a longitudinally disposed groove (194a) in said valve spool.

61. A control valve as claimed in claim 60 in which said groove (194a) is sized to provide a minimum cross sectional area for said flow path from said inlet port to said signal control port that is less than one-one hundredth of a square inch.

62. A control valve as claimed in claim 59, in which said control valve is of the type having a second inlet port (340b) intersecting said bore proximal to said signal control port (360), having a second work port (342b) intercepting said bore proximal to said second inlet port and distal from said signal control port; said return port means comprises a first return port (344a) intersecting said bore proximal to first said work port (342a) and a second return port (344b) intersecting said bore proximal to said second work port and distal from said second inlet port; said valve spool (350) is movable in a first direction to first said operating position, is movable in a second direction to a second operating position wherein said second inlet port is communicated to said second work port, and is movable in said first direction beyond first said operating position to a float position wherein both of said work ports (342a & 342b) are communicated to respective ones of said return ports (344a & 344b), the improvement which comprises:

a. said means for communicating said signal control port with said return port means and with first said work port further comprises second longitudinal and radial passage means (186b + 190b) for communicating said signal control port with said second work port when said valve spool is in said second operating position;

b. means (groove 194b), in said valve spool, for establishing fluid communication from said second inlet port to said signal control port when said valve spool is in said second operating position; and c. first said means in said valve spool is effective to obviate said fluid communication of first said inlet port with said signal control port when said valve spool is in said float position.

63. A control valve as claimed in claim 62 in which said means for communicating further comprises a three port logic valve (184) in said valve spool having a first logic port thereof in fluid communication with said signal control port (360), having a second logic port thereof in fluid communication with first said longitudinal passage (186a), and having the third logic port thereof in fluid communication with said second longitudinal and radial passage means (186b + 190b).

64. A directional control valve of the type which includes a body (36 or 236) having a spool bore (38 or 238) therein, having return port means (44a + 48, or 244b + 248) intersecting said bore, having an inlet port (40 or 240) intersecting said bore in spaced relationship to said return port means, and having a work port (42a or 242b) intercepting said bore intermediate of said inlet port and said return port means, and a valve spool (50 or 250) being slidably fitted into said bore and being movable from a standby position wherein said work port is isolated from said inlet port and said return port means to an operating position wherein said work port is communicated with said inlet port, the improvement which comprises:

a. a signal control port (60 or 260) in said body;

b. a load signal passage (54a or 254b) in said body communicating with said signal control port and intercepting said bore intermediate of said inlet port and work port;

c. an attenuation signal passage (46 or 246) intercepting said bore proximal to said return port means and distal from both said work port and said inlet port;

d. means, in said valve spool, for establishing a first fluid flow path from said signal control port to said work port through said load signal passage when said valve spool is in said operating position, and for establishing a second fluid flow path from said signal control port to said return port means through said attenuation signal passage when said valve spool is in said standby position; and e. a synthetic signal generator (52 of FIG. 1, 64 of FIG. 1A, 119 of FIG. 2, or 121 of FIG. 2) being interposed in one of said fluid flow paths.

65. A control valve as claimed in claim 64, in which said one fluid flow path comprises said first fluid flow path.

66. A control valve as claimed in claim 64, in which said one fluid flow path comprises said second fluid flow path.

67. A control valve as claimed in claim 64, in which said synthetic signal generator comprises an orifice (64 of FIG. 1A).

68. A control valve as claimed in claim 64, in which said synthetic signal generator comprises a relief valve (52 of FIG. 1, 119 of FIG. 2, or 121 of FIG. 2).

69. A control valve as claimed in claim 64, in which said return port means comprises a first return port (44a or 244b) intersecting said bore proximal to said first work port (42a or 242b) and a second return port (48 or 248) intersecting said bore proximal to said first return port and distal from said first work port, and said proximal location of said attenuation signal passage (46 or 246) to said return port means comprises said attenuation signal passage being interposed between said first and second return ports.

70. A control valve as claimed in claim 69, in which said establishing of said second fluid flow path to said return port means (44a + 48) when said valve spool is in said standby position comprises establishing said second fluid flow path to said second return port (48).

71. A control valve as claimed in claim 69, in which said establishing of said second fluid flow path to said return port means (244b + 248) when said valve spool is in said standby position comprises establishing said second fluid flow path to said first return port (244b).

72. A control valve as claimed in claim 64, in which said control valve is of the type having a second work port (42b or 242a), and said valve spool (50 or 250) is movable in a first direction to a first said operating position, is movable in a second direction to a second operating position wherein said inlet port (40 or 240) is communicated with said second work port, and is movable in said first direction beyond first said operating position to a float position wherein both of said work ports (42a & 42b, or 242a & 242b) are communicated with said return port means, the improvement which comprises:

said second fluid flow path being established when said valve spool is in said float position.

73. A control valve as claimed in claim 72, in which said return port means comprises a first return port (44a) being adjacent to and spaced from said first work port (42a), a second return port (48) being adjacent to and spaced from said first return port, and a third return port (44b) being adjacent to said second work port (42b); and said second fluid flow path comprises one (48) of said adjacent and spaced return ports (44a & 48) when said valve spool is in first said operating position, and said second fluid flow path comprises the other (44a) of said adjacent and spaced return ports when said valve spool is in said float position.

74. A control valve as claimed in claim 72 in which said return port means comprises a first return port (244b) being adjacent to and spaced from said first work port (242b), a second return port (248) being adjacent to and spaced from said first return port, and a third return port (244a) adjacent to and spaced from said second work port (242a); and said second fluid flow path comprises the same one of said return ports (244b) when said valve spool is in said float position as when said valve spool is in first said operating position.

75. In a load responsive hydraulic system of the type which includes a source of pressurized fluid having a pump (102) and a sump (14), a fluid actuated device (28), a directional control valve (226) having a movable valving element (250) and having both an operating position wherein fluid from said pump is supplied to said fluid actuated device at the load actuating pressure thereof and a standby position wherein said fluid actuated device is isolated from said pump, a fluid responsive means (120) having a signal chamber (116b) therein and being effective to control the pressure and the effective output of said pump in response to the pressure magnitude of a signal fluid supplied to said signal chamber, the improvement which comprises:

a. signal control means (262 + 254a + 246 + 274) in said control valve including a signal control port (260) connected to said signal chamber and including said valving element, for establishing a first fluid flow path (incl. 260 + 254a) which communicates said signal control port with said fluid actuated device, for sensing said load actuating pressure when said control valve is in said operating position, for establishing a second fluid flow path (incl. 246 + 274) which communicates said signal control port with said sump, and for sensing the fluid pressure in said sump when said control valve is in said standby position;

b. a signal supply restrictor (24) being connected to said pump to receive fluid therefrom and being connected to said signal control port (via logic valves 20a & 20b) to supply fluid thereto for use as said signal fluid; and c. a synthetic signal generator (121) being interposed in said second fluid flow path and imposing a predetermined flow resistance to fluid flow through said second fluid flow path whereby said synthetic signal generator is effective to increase the pressure magnitude of said signal fluid in said signal control port above that sensed by said second fluid flow path;

d. whereby said fluid responsive means is controlled by said sump pressure and by said increase in pressure magnitude when said control valve is in said standby position, and said fluid responsive means is controlled by said load actuating pressure when said control valve is in the other of said positions.

76. In a load responsive hydraulic system of the type which includes a source of pressurized fluid having a pump (102) and a sump (14), a fluid actuated device (28), a directional control valve (226) having a movable valving element (250) and having both an operating position wherein fluid from said pump is supplied to said fluid actuated device at the load actuating pressure thereof and a standby position wherein said fluid actuated device is isolated from said pump, a fluid responsive means (120) having a signal chamber (116b) therein and being effective to control the pressure and the effective output of said pump in response to the pressure magnitude of a signal fluid supplied to said signal chamber, the improvement which comprises:

a. signal control means (262 + 254a + 246 + 274) in said control valve including a signal control port (260) connected to said signal chamber and including said valving element, for establishing a first fluid flow path (260 + 254a) which communicates said signal control port with said fluid actuated device, for sensing said load actuating pressure when said control valve is in said operating position, for establishing a second fluid flow path (incl. 246 + 274) which communicates said signal control port with said sump, and for sensing the fluid pressure in said sump when said control valve is in said standby position;

b. a signal supply restrictor (24) being connected to said pump to receive fluid therefrom and being connected to said signal control port (via logic valve 20a & 20b) to supply fluid thereto for use as said signal fluid; and c. a synthetic signal generator (121) being interposed in one of said fluid flow paths and imposing a predetermined flow resistance to fluid flow through said one fluid flow path whereby said synthetic signal generator is effective to increase the pressure magnitude of said signal fluid in said signal control port above that sensed by said one fluid flow path;

d. whereby said fluid responsive means is controlled by said one sensed pressure and by said increase in pressure magnitude when said control valve is in said one position, and said fluid responsive means is controlled by said other sensed pressure when said control valve is in the other of said positions;

said pump comprising a variable displacement pump (102) and said fluid responsive mechanism comprises a displacement control mechanism (120).

77. In a load responsive hydraulic system of the type which includes a source of pressurized fluid having a pump (12) and a sump (14), a fluid actuated device (28), a directional control valve (26) having a movable valving element (50) and having both an operating position wherein fluid from said pump is supplied to said fluid actuated device at the load actuating pressure thereof and a standby position wherein said fluid actuated device is isolated from said pump, a fluid responsive means (16 of FIG. 1, or 120 of FIG. 2) having a signal chamber (34 of FIG. 1, or 116b of FIG. 2) therein and being effective to control the pressure and the effective output of said pump in response to the pressure magnitude of a signal fluid supplied to said signal chamber, the improvement which comprises a. signal control means (62 + 54a + 46 + 74 of FIG. 1) in said control valve including a signal control port (60) connected to said signal chamber and including said valving element, for establishing a first fluid flow path (incl. 60 + 54a of FIG. 1) which communicates said signal control port with said fluid actuated device, for sensing said load actuating pressure when said control valve is in said operating position, for establishing a second fluid flow path (incl. 46 + 74 of FIG. 1) which communicates said signal control port with said sump, and for sensing the fluid pressure in said sump when said control valve is in said standby position;

b. a signal supply restrictor (24) being connected to said pump to receive fluid therefrom and being connected to said signal control port (via logic valves 20a & 20b) to supply fluid thereto for use as said signal fluid; and c. a synthetic signal generator in the form of a relief valve (52) being interposed in one of said fluid flow paths and imposing a predetermined flow resistance to fluid flow through said one fluid flow path, said synthetic signal generator being effective to increase the pressure magnitude of said signal fluid in said signal control port above that sensed by said one fluid flow path;

d. whereby said fluid responsive means is controlled by said one sensed pressure and by said increase in pressure magnitude when said control valve is in said one position, and said fluid responsive means is controlled by said other sensed pressure when said control valve is in the other of said positions.

78. In a load responsive hydraulic system of the type which includes a pump (12 or 102), a sump (14), a fluid actuated device (28), a directional control valve (26 or 226) having a movable valving element and having both an operating position wherein fluid from said pump is supplied to said fluid actuated device at the load actuating pressure thereof and a standby position wherein said fluid actuated device is isolated from said pump, and a fluid responsive means (16 of FIG. 1, or 120 of FIG. 2) having a signal chamber (34 of FIG. 1, or 116b of FIG. 2) therein and being effective to control the pressure and the effective output of said pump in response to the pressure magnitude of a signal fluid supplied to said signal chamber, and which includes:

a. a signal supply restrictor (24) connected to said pump to receive fluid from said pump;

b. signal control means (60 + 62 + 46 + 54a, etc. of FIG. 1) including a signal control port in said control valve and including said valving element for establishing a first fluid flow path which communicates said signal control port with said fluid actuated device, for sensing said load actuating pressure when said control valve is in said operating position, for establishing a second fluid flow path which communicates said signal control port with said sump, and for sensing the fluid pressure in said sump when said control valve is in said standby position;

c. signal conduit means (72 or 272) connecting said signal chamber to said signal supply restrictor and to said signal control port, whereby said signal supply restrictor supplies fluid from said pump to said signal conduit for use as said signal fluid and the pressure magnitude of said signal fluid is controlled by said load actuating pressure when said control valve is in said operating position and by said sump pressure when said control valve is in said standby position; and d. a synthetic signal generator (52 and 64 of FIG. 1, or 119 or 121 of FIG. 2) having a predetermined flow resistance, being interposed in one of said fluid flow paths, and being effective to increase the pressure magnitude of said signal fluid by said flow resistance when said control valve is in the one of said positions wherein said one fluid flow path is established and said signal fluid flows through said synthetic signal generator and through said one fluid flow path;

said control valve being of the type having a body with a spool bore therein, a work port intersecting said bore, a return port intersecting said bore, an inlet port intersecting said bore, and said valving element comprising a valve spool in said bore being movable from said standby position to said operating position, the improvement which comprises said signal control means comprising a load signal passage (54a of FIG. 1) which provides a portion of said first fluid flow path and which intercepts said bore intermediate of said inlet port (40 of FIG. 1) and said work port (42a of FIG. 1).

* * * * *

UNITED STATES PATENT AND TRADEMARK OFFICE
CERTIFICATE OF CORRECTION

PATENT NO. : 3,971,216
DATED : July 27, 1976
INVENTOR(S) : Wendell E. Miller

It is certified that error appears in the above-identified patent and that said Letters Patent are hereby corrected as shown below:

Column 2, line 6, after "to" insert --a--.

Column 3, line 46, after "valve" insert --is--.

Column 6, line 30, "actuating" should read --actuation--.

Column 6, line 38, "subseuently" should read --subsequently--.

Column 6, line 64, "second" should read --sensed--.

Column 9, line 19, there should only be one comma after "28".

Column 10, line 24, "snythetic" should read --synthetic--.

Column 10, line 32, "supplied" should read --supplies--.

Column 10, line 35, "supplied" should read --supplies--.

Column 10, line 67, "capcity" should read --capacity--.

Column 15, line 21, "has" should read --had--.

Column 18, line 10, "detector" should read --generator--.

Column 18, line 68, after "fluid" insert --flow--.

Column 19, line 44, after "signal" insert --fluid--.

Column 19, line 65, "FIG." should read --FIGS.--.

Column 22, line 23, "ares" should read --are--.

UNITED STATES PATENT AND TRADEMARK OFFICE
CERTIFICATE OF CORRECTION

PATENT NO. : 3,971,216
DATED : July 27, 1976
INVENTOR(S) : Wendell E. Miller

It is certified that error appears in the above-identified patent and that said Letters Patent are hereby corrected as shown below:

Column 23, line 49, before the first "logic" insert --b.--.

Column 23, line 51, after "said" insert --signal--.

Column 25, line 25, "itersecting" should read --intersecting--.

Column 25, line 52, after "three-port" insert --logic--.

Column 36, line 8, "restictor" should read --restrictor--.

Signed and Sealed this

Ninth Day of November 1976

[SEAL]

Attest:

RUTH C. MASON
*Attesting Officer*

C. MARSHALL DANN
*Commissioner of Patents and Trademarks*